United States Patent
Watanabe et al.

(10) Patent No.: US 10,795,092 B2
(45) Date of Patent: Oct. 6, 2020

(54) OPTICAL CONNECTOR, MULTIPLE OPTICAL CONNECTOR, AND OPTICAL CONNECTION STRUCTURE

(71) Applicant: SUMITOMO ELECTRIC INDUSTRIES, LTD., Osaka-shi, Osaka (JP)

(72) Inventors: Takuro Watanabe, Yokohama (JP); Dai Sasaki, Yokohama (JP); Yoshikyo Tamekuni, Yokohama (JP); Takako Hosokawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/323,010

(22) PCT Filed: Sep. 5, 2017

(86) PCT No.: PCT/JP2017/031982
§ 371 (c)(1),
(2) Date: Feb. 4, 2019

(87) PCT Pub. No.: WO2018/047829
PCT Pub. Date: Mar. 15, 2018

(65) Prior Publication Data
US 2019/0187385 A1 Jun. 20, 2019

(30) Foreign Application Priority Data

Sep. 12, 2016 (JP) .................................. 2016-177751
Mar. 30, 2017 (JP) .................................. 2017-068689

(51) Int. Cl.
*G02B 6/38* (2006.01)

(52) U.S. Cl.
CPC .............. *G02B 6/3849* (2013.01); *G02B 6/38* (2013.01); *G02B 6/3869* (2013.01)

(58) Field of Classification Search
None
See application file for complete search history.

(56) References Cited

U.S. PATENT DOCUMENTS

| 5,555,332 A | * | 9/1996 | Dean | ...................... G02B 6/382 |
| | | | | 385/53 |
| 6,206,579 B1 | * | 3/2001 | Selfridge | ............. G02B 6/3869 |
| | | | | 385/53 |

(Continued)

FOREIGN PATENT DOCUMENTS

| CN | 103339542 A | 10/2013 |
| EP | 0538089 A1 | 4/1993 |

(Continued)

*Primary Examiner* — Michelle R Connelly
(74) *Attorney, Agent, or Firm* — Faegre Drinker Biddle & Reath LLP

(57) ABSTRACT

An optical connector having a shutter is disclosed. The optical connector comprises an optical connection component configured to hold one or a plurality of optical fibers, and having a light incidence/emission end surface being movable in the connection direction with respect to the optical connection component; a second member having a shutter part that performs opening/closing of an opening, the second member being attached to the first member in a state of being rotatable around a rotation axis; a first sealing member contacting the first member over a whole circumference of the opening, the first sealing member also contacting the shutter part over the whole circumference of the opening when the shutter part is in a closed state; and a linkage mechanism that rotates the second member in conjunction with movement of the first member along the connection direction with respect to the optical connection component.

20 Claims, 28 Drawing Sheets

(56) References Cited

U.S. PATENT DOCUMENTS

| | | | |
|---|---|---|---|
| 8,506,173 B2 * | 8/2013 | Lewallen | G02B 6/3817 385/53 |
| 2005/0041928 A1 * | 2/2005 | Zimmel | G02B 6/3825 385/55 |
| 2009/0185778 A1 * | 7/2009 | Howard | G02B 6/3825 385/58 |
| 2010/0014812 A1 | 1/2010 | Dobler | |
| 2011/0206325 A1 | 8/2011 | Hioki et al. | |
| 2013/0315539 A1 * | 11/2013 | Koreeda | G02B 6/3893 385/69 |
| 2014/0126874 A1 | 5/2014 | Hioki et al. | |

FOREIGN PATENT DOCUMENTS

| | | |
|---|---|---|
| JP | 2004-177417 A | 6/2004 |
| JP | 2006-220951 A | 8/2006 |
| JP | 2007-58099 A | 3/2007 |
| JP | 2008-133953 A | 6/2008 |
| JP | 2011-170264 A | 9/2011 |
| WO | WO-2012/120914 A | 9/2012 |

* cited by examiner

Fig.23
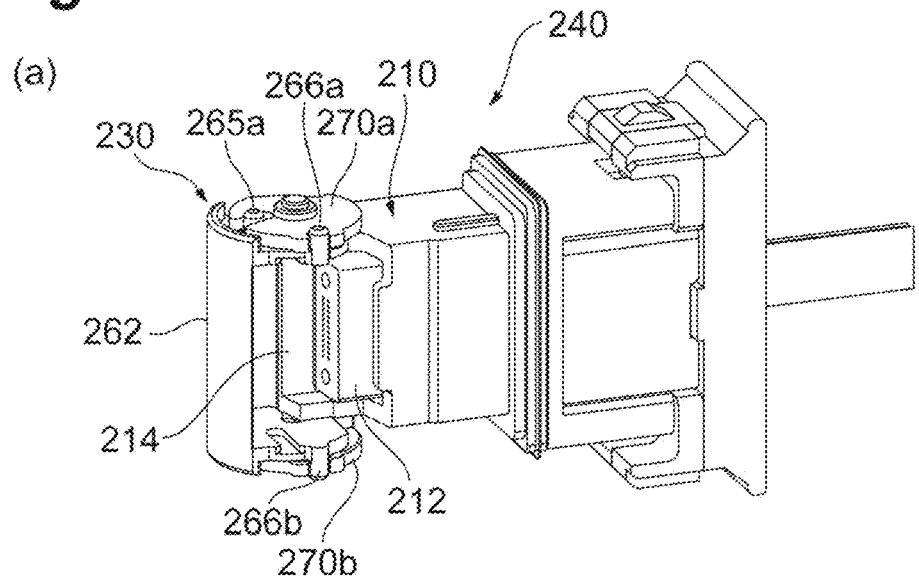
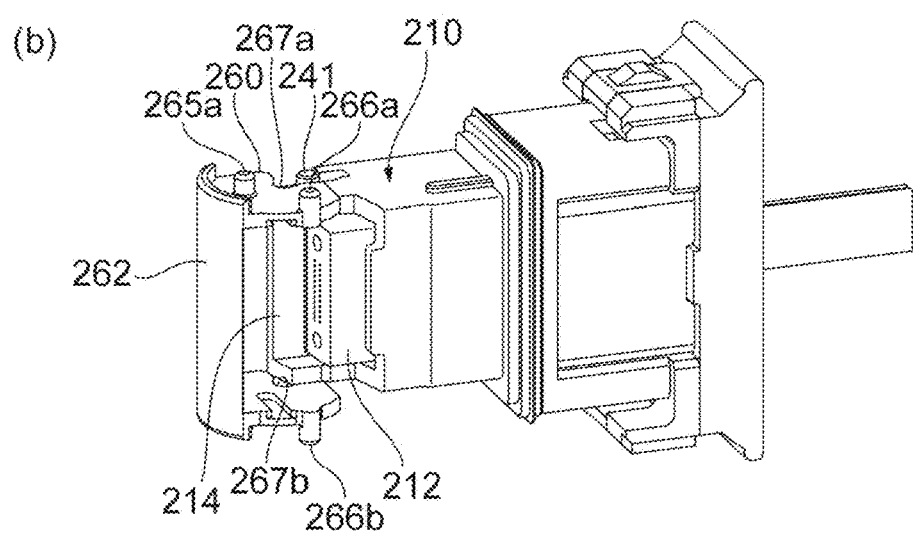
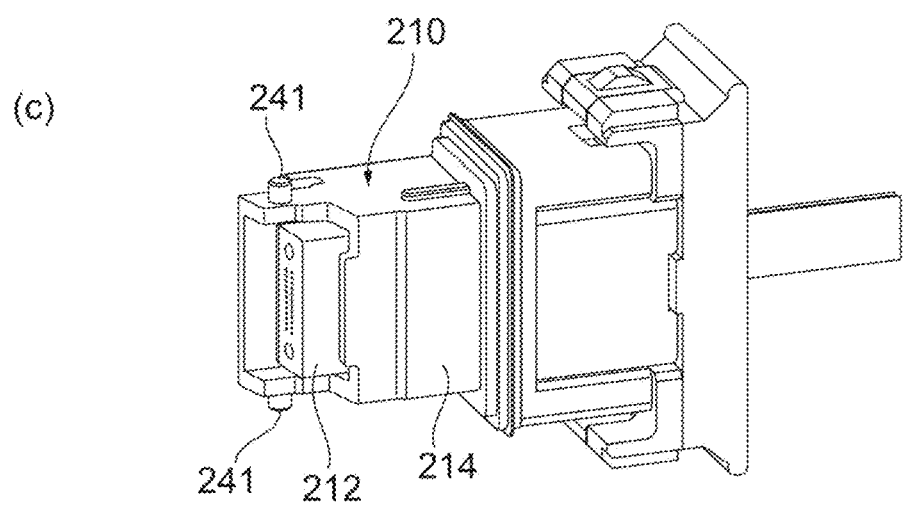

Fig.24
(a)
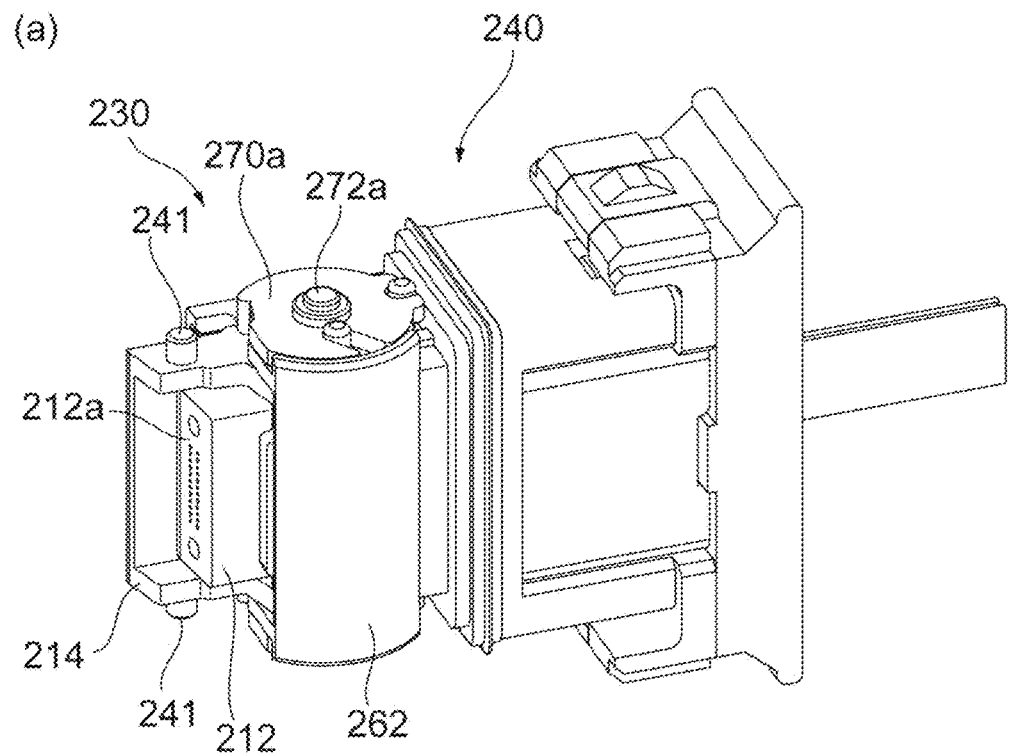
(b)
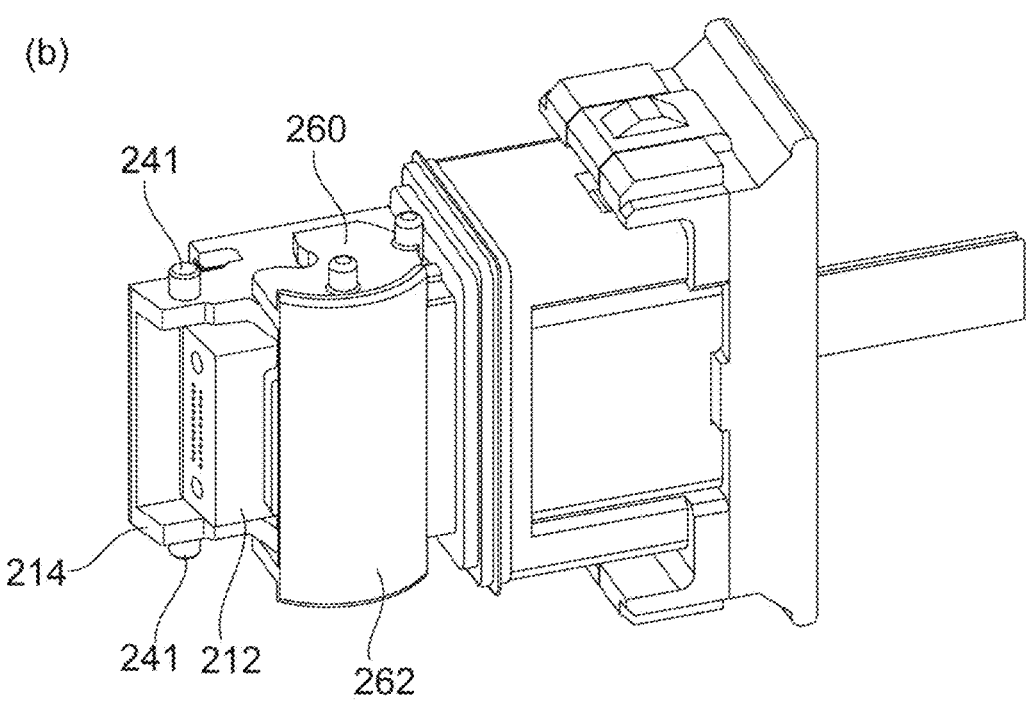

OPTICAL CONNECTOR, MULTIPLE OPTICAL CONNECTOR, AND OPTICAL CONNECTION STRUCTURE

TECHNICAL FIELD

The present invention relates to an optical connector, a multiple optical connector, and an optical connection structure. The present application claims the benefit of priority of Japanese Patent Application No. 2016-177751 filed on Sep. 12, 2016, and Japanese Patent Application No. 2017-068689 filed on Mar. 30, 2017, the contents of which are incorporated herein by reference in its entirely.

BACKGROUND ART

Patent Literature 1 discloses an optical connector with a shutter. This optical connector incorporates a shutter unit in a center of a connector housing, and light emitted from a connected optical connector in a connector hole is shielded by a shutter piece of the shutter unit. Furthermore, the shutter unit is composed of a conductive member, so that this optical connector ensures electromagnetic wave shielding performance.

Patent Literature 2 discloses an optical connector plug with a shutter. This optical connector plug comprises an outer cover covering a front outer periphery. The outer cover is pressed against an optical connector adaptor to be capable of retreating from a front end position to a rear end position of the optical connector plug. A shutter capable of rocking from a lid closing position to a lid opening position is provided inside the outer cover, and the shutter can be automatically opened and closed by a rack and pinion system in conjunction with forward and backward movement of the outer cover.

CITATION LIST

Patent Literature

Patent Literature 1: Japanese Unexamined Patent Publication No. 2004-177417
Patent Literature 2: Japanese Unexamined Patent Publication No. 2011-170264

SUMMARY OF INVENTION

An optical connector of this disclosure comprises: an optical connection component configured to hold one or a plurality of optical fibers, the optical connection component having a light incidence/emission end surface at one end in an connection direction; a first member having a cylindrical shape including a first opening and a second opening at a first end and a second end in the connection direction, respectively, the first member being movable in the connection direction with respect to the optical connection component inserted from the second opening; a second member having a shutter part that performs opening/closing of the first opening, the second member being attached to the first member in a state of being rotatable around a rotation axis intersecting with the connection direction; a first sealing member being in contact with the first member over a whole circumference of the first opening, the first sealing member also being in contact with the shutter part over the whole circumference of the first opening when the shutter part is in a closed state; a second sealing member provided in a gap between the optical connection component and the first member, and being in contact with both an outside surface of the optical connection component and an inside surface of the first member over the whole circumference of the first member; and a linkage mechanism that rotates the second member in conjunction with movement of the first member along the connection direction with respect to the optical connection component. The light incidence/emission end surface projects forward in the connection direction from the first opening by movement of the first member backward in the connection direction with respect to the optical connection component.

A multiple optical connector of this disclosure comprises a plurality of connector parts, each of the connector parts being the above optical connector. The plurality of connector parts are sequentially arrayed in a direction intersecting with both the connection direction and the rotation axis, and connected to each other.

An optical connection structure of this disclosure comprises a first optical connector and a second optical connector each being the above optical connector. When the first optical connector and the second optical connector are connected to each other along the connection direction, the first sealing member of the first optical connector, and the first sealing member of the second optical connector abut on each other over whole circumferences of the respective first openings, and the first member moves backward in the connection direction with respect to the optical connection component by pressing force generated by the abutting.

BRIEF DESCRIPTION OF DRAWINGS

FIG. 23 is a perspective view illustrating an internal structure in a state in which the shutter of the optical connector according to the third embodiment is closed.

FIG. 24 is a perspective view illustrating an internal structure in a state in which the shutter of the optical connector according to the third embodiment is opened.

DESCRIPTION OF EMBODIMENTS

Technical Problem Solved by Disclosure

Figure 1:
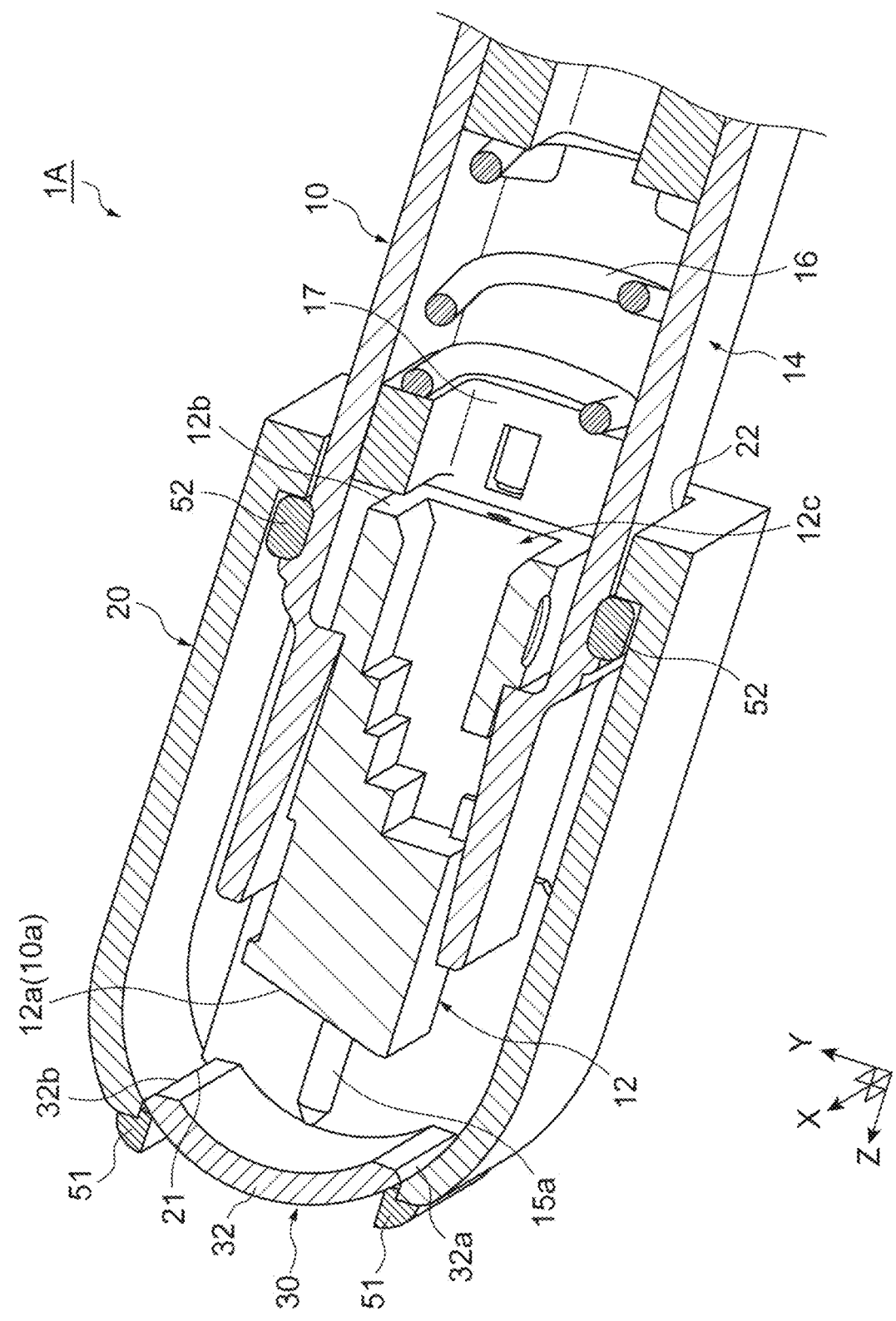
FIG. 1 is a cut-away perspective view illustrating a structure of an optical connector according to a first embodiment, and illustrates a cut-away cross-sectional view along a YZ plane.

In a general optical connector, an end surface of a ferrule of one optical connector, and an end surface of a ferrule of the other optical connector face each other, so that optical fibers held by these ferrules are optically coupled. Therefore, in many cases, the ferrule end surfaces are disposed in a state of being exposed from a housing member. Accordingly, foreign matters such as dust and dirt are easily to be adhered to the ferrule end surfaces, and the foreign matter needs to be removed at the time of connection of the optical connectors. Particularly, when physical contact (PC) type optical connectors are connected in a state in which foreign matters are adhered to the ferrule end surfaces, the foreign matters are closely adhered to the ferrule end surfaces by pressing force. A contact type cleaner needs to be used in order to remove the closely adhered foreign matters, and cleaning needs to be frequently performed in order to prevent close adhesion of the foreign matter.

Herein, in order to suppress the adhesion of the foreign matter to the ferrule end surface, it is considered to provide a shutter covering the ferrule end surface. For example, in the optical connector described in each of the Patent Literatures 1, 2, a shutter for shielding light (eye safety) is provided, but dustproof is not considered at all. A large number of gaps for sliding at the time of inserting and removing exist in a housing component of the optical connector, and it is difficult that dustproof performance is satisfied by simply providing the shutter.

Advantageous Effect of Disclosure

According to an optical connector, a multiple optical connector, and an optical connection structure according to this disclosure, it is possible to enhance dustproof performance.

Description of Embodiment of Present Invention

First, contents of embodiments of the present invention will be listed and described.

An optical connector according to an embodiment of the present invention comprises: an optical connection component configured to hold one or a plurality of optical fibers, and having a light incidence/emission end surface at one end in an connection direction; a first member having a cylindrical shape including a first opening and a second opening at a first end and a second end in the connection direction, respectively, the first member being movable along the connection direction with respect to the optical connection component inserted from the second opening; a second member having a shutter part that performs opening/closing of the first opening, the second member being attached to the first member in a state of being rotatable around a rotation axis intersecting with the connection direction; a first sealing member being in contact with the first member over a whole circumference of the first opening, the first sealing member also being in contact with the shutter part over the whole circumference of the first opening when the shutter part is in a closed state; a second sealing member provided in a gap between the optical connection component and the first member, and being in contact with both an outside surface of the optical connection component and an inside surface of the first member over the whole circumference of the first member; and a linkage mechanism that rotates the second member in conjunction with movement of the first member along the connection direction with respect to the optical connection component. The light incidence/emission end surface projects forward in the connection direction from the first opening by movement of the first member backward in the connection direction with respect to the optical connection component.

When this optical connector is in a non-connection state, the first member is located at a front part of the optical connection component, and the shutter part closes the first opening of the first member. At this time, the first sealing member is in contact with the first opening and the shutter part over the whole circumference, and therefore the gap between the first opening of the first member and the shutter part is blocked. Additionally, the second sealing member is in contact with both the outside surface of the optical connection component and the inside surface of the first member over the whole circumference of the first member, and therefore the gap between the optical connection component and the first member is also blocked. Consequently, the light incidence/emission end surface (for example, a ferrule end surface) is located in a sealed space defined by the shutter part, the first member, and the optical connection component. Accordingly, the light incidence/emission end surface can be protected from a foreign matter. Additionally, when this optical connector is connected, the first member moves backward in the connection direction with respect to the optical connection component by pressing force from a mating optical connector, for example. Then, the second member including the shutter part rotates in conjunction with the movement of the first member, and the shutter part transfers from a closed state to an open state. At the same time, the light incidence/emission end surface projects forward in the connection direction from the first opening. Consequently, the light incidence/emission end surface faces a light incidence/emission end surface of the mating optical connector, and can be optically coupled to the light incidence/emission end surface of the mating optical connector. Thus, according to the above optical connector, at the time of the connection, the light incidence/emission end surface is suitably exposed, and at the time of the non-connection state, the periphery of the light incidence/emission end surface is sealed, and dustproof performance can be enhanced.

In the above optical connector, the second member may have: a first rotary component having the shutter part, and being rotatable around the rotation axis; and a second rotary component that moves the first rotary component backward in the connection direction before rotating the first rotary component around the rotation axis when the shutter part is transferred from the closed state to an open state. Consequently, the first rotary component having the shutter part once retreats backward in the connection direction before rotating, and it is possible to suppress adhesion of dust to a ferrule end surface or the like at the time of motion for fitting to other connector, the dust being adhered to the shutter part, and then being detached in a contact area with the first sealing member at the time of rotation of the second member.

In the above optical connector, the second rotary component may move the first rotary component forward in the connection direction after rotating the first rotary component around the rotation axis when the shutter part is transferred from the open state to the closed state. Consequently, dust adhered to the shutter part is removed in the contact area with the first sealing member, and when the optical connector returns to a sealed state, it is possible to suppress adhesion of the dust to the inside of the connector such as the ferrule end surface.

In the above optical connector, the second rotary component may move the first rotary component forward or backward along the connection direction in conjunction with movement of the first member along the connection direction with respect to the optical connection component. Consequently, it is possible to move the first rotary component of the second member without performing motion other than the movement of the first member, and operation of the optical connector is facilitated.

In the above optical connector, the second rotary component may have a structure in which linear movement of the first member along the connection direction is converted into rotating motion, and move the first rotary component forward or backward along the connection direction by motion conversion by the structure. Consequently, it is possible to more reliably prevent dust adhered to the shutter part from being adhered to the ferrule end surface or the like.

In the above optical connector, the first rotary component may include a first projection and a second projection, and a hole or a cutout corresponding to a linkage projection of the optical connection component; the second rotary component may include a shaft projection attached to a bearing of the first member in a rotatable state, a first hole or a first cutout corresponding to the first projection, a second hole or a second cutout corresponding to the second projection, and a third hole or a third cutout corresponding to the linkage projection of the optical connection component. Furthermore, the linkage projection of the optical connection component may be located in the hole or the cutout of the first rotary component, and the third hole or the third cutout of the second rotary component, the first projection of the first rotary component may be located in the first hole or the first cutout of the second rotary component, and the second projection of the first rotary component may be located in the second hole or the second cutout of the second rotary component. Consequently, it is possible to more reliably prevent dust adhered to the shutter part from being adhered to the ferrule end surface or the like. The "hole" used herein includes a through hole or a bottomed recess (recess), and the same applies to the following.

In the above optical connector, the second rotary component may have a shaft projection attached to a bearing of the first member in a rotatable state, a first projection and a second projection provided on a surface opposite to the shaft projection, a hole or a cutout corresponding to a linkage projection of the optical connection component, and the first rotary component may have a first hole or a first cutout corresponding to the first projection of the second rotary component, and having a long hole shape extending so as to incline to the connection direction, a second hole or a second cutout corresponding to the second projection of the second rotary component and the linkage projection of the optical connection component. Furthermore, the linkage projection of the optical connection component may be located in the second hole or the second cutout of the first rotary component, and the hole or the cutout of the second rotary component, the first projection of the second rotary component may be located in the first hole or the first cutout of the first rotary component, and the second projection of the second rotary component may be located in the second hole or the second cutout of the first rotary component. Consequently, it is possible to more reliably prevent dust adhered to the shutter part from being adhered to the ferrule end surface or the like.

The above optical connector may comprise a guide mechanism that guides at least one of rotating motion of the second member around the rotation axis, and movement of the second member along the connection direction. This guide mechanism may have a step or a groove provided in one of the first member and the second member, and a guide projection provided in the other of the first member and the second member, and the step or the groove may guide movement of the guide projection. Consequently, at the time of the rotating motion of the second member or the movement of the second member along the connection direction, motion of the second member can be smoothly performed without wobbling of the attitude of the second member having the shutter part. In this configuration, the step or the groove may be provided in an inner wall of the first member, and the guide projection may be provided in the second member. In this case, the step or the groove and the guide projection of the guide mechanism can be relatively easily provided in the optical connector. However, the step or the groove may be provided in the second member, and the guide projection may be provided in the inner wall of the first member.

In the above optical connector, the optical connection component may have a ferrule having the light incidence/emission end surface on a front side in the connection direction, and an inner housing covering and holding the ferrule. The optical connector may further comprise a third sealing member being in contact with both the ferrule and the inner housing on a back side in the connection direction. Consequently, dust from the back side of the ferrule can be prevented from entering the front end surface of the ferrule provided in the light incidence/emission end surface.

In the above optical connector, a shape of an outer surface of the shutter part in a cross-section perpendicular to the rotation axis may be a projecting curved line shape swollen in a direction away from the rotation axis, and a distance between the outer surface at one end of the shutter part on an opening direction, and the rotation axis may be longer than a distance between the outer surface at one end of the shutter part on a closing direction, and the rotation axis. Consequently, when the second member rotates, and the shutter part transfers from the closed state to the open state, the shutter part and the first sealing member can be separated at an early stage, and friction force at the time of rotation can be reduced. Additionally, even when the shutter part transfers from the open state to the closed state, a state in which the shutter part and the first sealing member are separated is kept until a time just before closing, and therefore the first opening can be more reliably sealed.

In the above optical connector, the linkage mechanism may have: a linkage projection provided in one of the optical connection component and the second member; and a linkage hole or a linkage cutout provided in the other of the optical connection component and the second member, and engaging with the linkage projection. In this case, when the first member moves in the connection direction, rotating force by engagement of the linkage projection, and the linkage hole or the linkage cutout is generated in the second member. Accordingly, the second member is rotated in conjunction with the movement of the first member in the connection direction with respect to the optical connection component, and can be suitably transferred from the closed state to the open state, or from the open state to the closed state.

In the above optical connector, a distance between the light incidence/emission end surface, and the linkage projection in the connection direction may be 20 mm or less. Consequently, it is possible to reduce the length of the optical connector in the connection direction, and to miniaturize the optical connector.

In the above optical connector, the linkage projection may be provided in the optical connection component, and the linkage hole or the linkage cutout may be provided in the second member, and a distance between the rotation axis and the linkage projection in the closed state of the shutter part, and a distance between the rotation axis and the linkage projection in the open state of the shutter part may be equal to each other. Consequently, it is possible to reduce the length of the optical connector in the connection direction, and to miniaturize the optical connector.

In the above optical connector, the second member may include at least one material of polyoxymethylene (POM), nylon, and high density polyethylene (HDPE). The second member includes these materials having no dusting characteristic and being excellent in sliding, so that it is possible to smoothly perform opening/closing of the shutter part.

In the above optical connector, transmittance of the shutter part to light of a wavelength of 800 nm to 1600 nm may be 0% to 50%. Consequently, the shutter part can have a light shielding function, and eye safety performance can be enhanced.

In the above optical connector, the second sealing member may be fixed to the optical connection component, and the first member and the second sealing member may slide mutually. Consequently, it is possible to easily perform assembly of the optical connector.

In the above optical connector, the second sealing member may be fixed to the first member, and the optical connection component and the second sealing member may slide mutually. Consequently, it is possible to enhance a dustproof property.

A multiple optical connector according to an embodiment of the present invention comprises a plurality of connector parts, each of the connector parts being any of the above optical connectors. The plurality of connector parts are sequentially arrayed in the direction orthogonal to both the connection direction and the rotation axis, and connected to each other. According to the multiple optical connector having such a configuration, a larger number of optical fibers can be optically coupled by a simple means while suppressing adhesion of foreign matters to end surfaces of ferrules or the like. In addition to this, according to such a configuration, walls between adjacent connector parts are omitted or integrated, or respective shutter parts are integrated, so that it is possible to easily attain further miniaturization of the apparatus. From a view point of a dustproof property, a configuration in which each connector part has an individual shutter part can be employed, but a configuration in which all the connector parts have a single shutter part may be employed.

An optical connection structure according to an embodiment of the present invention comprises a first optical connector and a second optical connector each being any of the above optical connectors. When the first optical connector and the second optical connector are connected to each other along the connection direction, the first sealing member of the first optical connector, and the first sealing member of the second optical connector abut on each other over whole circumferences of the respective first openings, and the first member may move backward in the connection direction with respect to the optical connection component by pressing force generated by the abutting. Consequently, the first member automatically moves backward in the connection direction with respect to the optical connection component when the first optical connector and the second optical connector are connected, and therefore the shutter part can be automatically brought into the open state, and the light incidence/emission end surface can be projected. Additionally, even in a state in which the optical connectors are connected, the periphery of the light incidence/emission end surface is sealed by the first sealing members, and dustproof performance can be enhanced.

Details of Embodiments of Present Invention

Specific examples of optical connectors and optical connection structures according to embodiments of the present invention will be hereinafter described with reference to the drawings. The present invention is defined by the terms of the claims, rather than the embodiments and examples of embodiment described above, it is intended to include any modifications within the meaning and range of equivalency of the claims. In the following description, the same components in the description of the drawing are denoted by the same reference numerals, and overlapped description will be omitted. In the following description, an XYZ orthogonal coordinate system is illustrated as necessary in each drawing, and a Z-axis is along the connection direction.

First Embodiment

Figure 2:
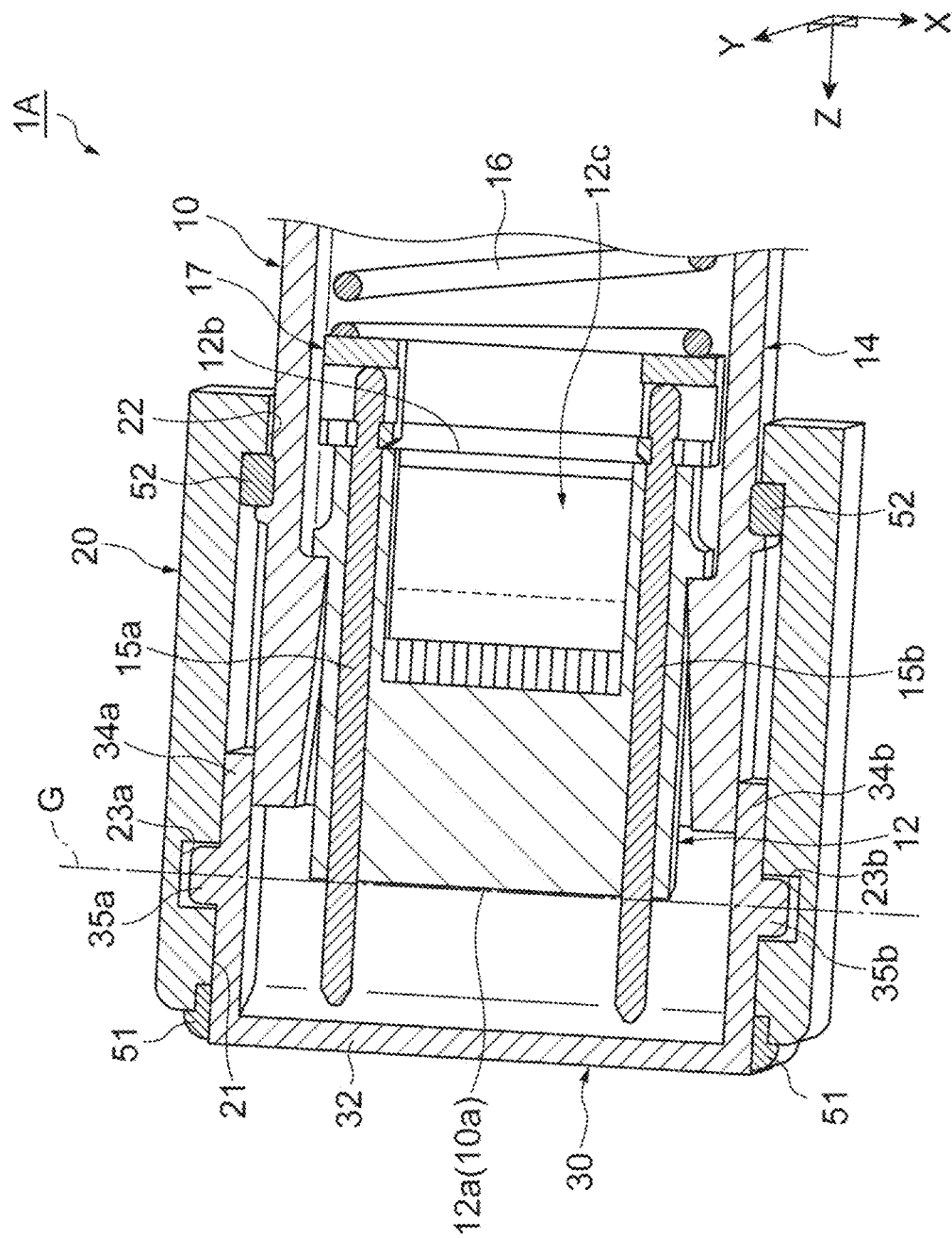
FIG. 2 is another cut-away perspective view illustrating the structure of the optical connector according to the first embodiment, and illustrates a cut-away cross-sectional view along the XZ plane.

FIG. 1 is a cut-away perspective view illustrating a structure of an optical connector 1A according to a first embodiment of the present invention, and illustrates a cut-away cross-sectional view along a YZ plane. FIG. 2 is another cut-away perspective view illustrating the structure of the optical connector 1A, and illustrates a cut-away cross-sectional view along the XZ plane. As illustrated in FIG. 1 and FIG. 2, the optical connector 1A of this embodiment comprises an optical connection component 10, an outer housing 20 (first member), a shutter component 30 (second member), a sealing member 51 (first sealing member), and a sealing member 52 (second sealing member).

The optical connection component 10 has a ferrule 12, an inner housing 14, and a coil spring 16. Furthermore, the optical connection component 10 may have a pair of guide pins 15a, 15b as necessary. The ferrule 12 is a member holding a plurality of optical fibers. The ferrule 12 may hold a single optical fiber. The ferrule 12 has a substantially rectangular parallelepiped appearance, and has a front end surface 12a and a rear end surface 12b facing each other in the Z direction. In the rear end surface 12b, a single fiber introducing port 12c for collectively introducing the plurality of optical fibers is formed. Furthermore, a plurality of fiber holding holes allowing the plurality of optical fibers to be inserted therein are formed from the fiber introducing port 12c to the front end surface 12a. These fiber holding holes penetrate from the fiber introducing port 12c to the front end surface 12a, and have openings in the front end surface 12a. The openings of the plurality of fiber holding holes in the front end surface 12a are arrayed one- or two-dimensionally.

The front end surface 12a of the ferrule 12 becomes a light incidence/emission end surface 10a in this embodiment. That is, end surfaces of the plurality of optical fibers are exposed on the front end surface 12a of the ferrule 12, and light incidence and emission are performed on the front end surface 12a. The front end surface 12a faces the front end surface 12a of a ferrule 12 of a connection mating, and abuts on the front end surface 12a in an example. The ferrule 12 is made of, for example, resin.

The pair of guide pins 15a, 15b penetrate a pair of guide pin insertion holes formed in the ferrule 12. Front ends of the pair of guide pins 15a, 15b project forward in the Z direction from the front end surface 12a of the ferrule 12, and are fitted in guide pin insertion holes of the ferrule 12 of the connection mating. Consequently, the ferrule 12 and the ferrule 12 of the connection mating are accurately positioned to each other. Rear ends of the pair of guide pins 15a, 15b are fixed to a guide pin keeper 17. The guide pin keeper 17 abuts on the rear end surface 12b of the ferrule 12. The guide pins 15a, 15b are made of, for example, metal.

The coil spring 16 is disposed on a rear end of the guide pin keeper 17, and urges the guide pin keeper 17 forward in the Z direction. Consequently, urging force forward in the Z direction is applied to the ferrule 12 through the guide pin keeper 17, and pressing force to the mating ferrule 12 is generated.

The inner housing 14 is a member covering and holding the ferrule 12. The inner housing 14 has a square cylindrical shape, and the ferrule 12 is stored in one opening of the inner housing, and fixed. Additionally, the above guide pin keeper 17 and coil spring 16 are stored in a space inside the inner housing 14. The inner housing 14 is made of, for example, resin.

The outer housing 20 is a member having a square cylindrical shape. The outer housing 20 has an opening 21 (first opening) in a first end in the Z direction, and has an opening 22 (second opening) in a second end. The optical connection component 10 is inserted from the opening 22 of the outer housing 20, and the outer housing 20 is slidable (movable) in the Z direction with respect to the optical connection component 10. The light incidence/emission end surface 10a can project forward in the Z direction from the opening 21 by sliding of the outer housing 20 backward in the Z direction with respect to the optical connection component 10. The outer housing 20 is made of, for example, resin.

Figure 3:
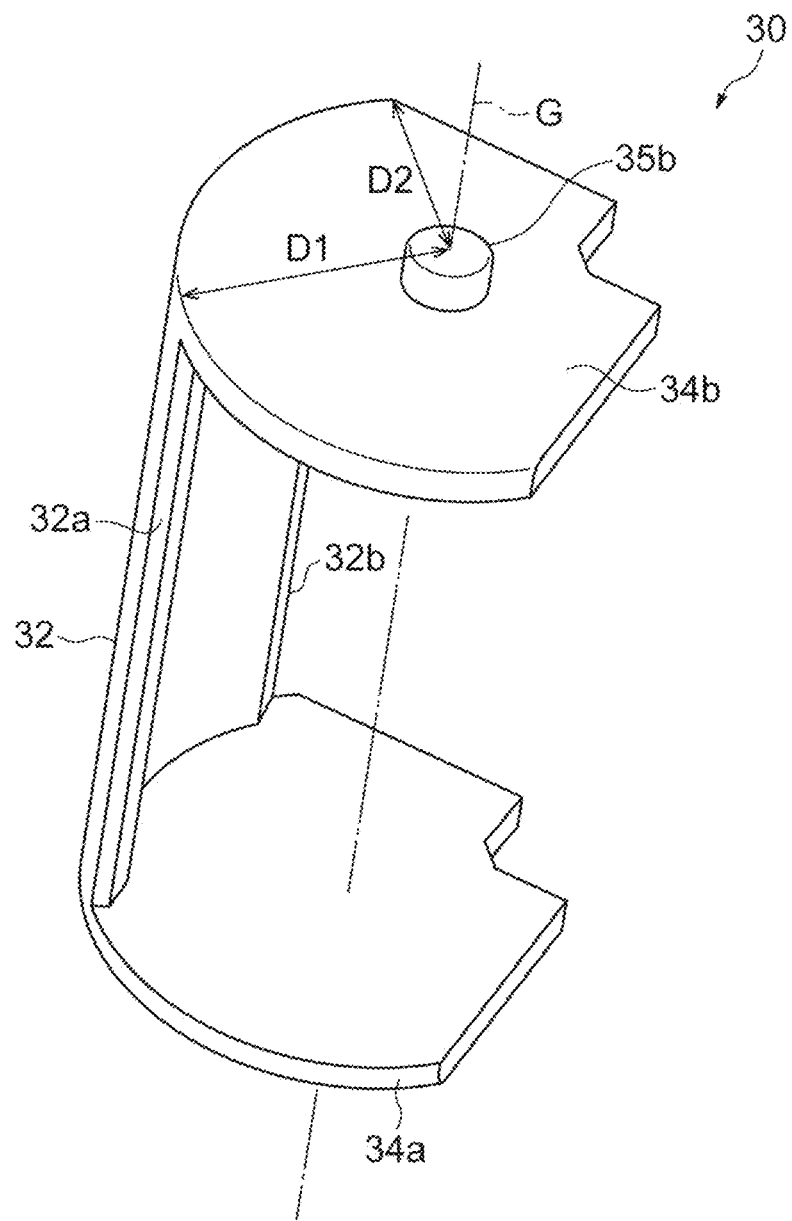
FIG. 3 is a perspective view illustrating an appearance of a shutter component of the optical connector according to the first embodiment.

The shutter component 30 is attached to the outer housing 20 in a state of being rotatable around a rotation axis G intersecting with the Z direction. FIG. 3 is a perspective view illustrating an appearance of the shutter component 30. The shutter component 30 has a shutter part 32 expanding in a surface intersecting with the Z direction, and support parts 34a, 34b provided in both ends of the shutter part 32 in the X direction. The support parts 34a, 34b each have a plate shape extending along the YZ plane, and shaft projections 35a, 35b (refer to FIG. 2) forming the rotation axis G are provided on outside surfaces of the support parts 34a, 34b. The shaft projections 35a, 35b are provided on a back side in the Z direction with respect to the shutter part 32, and are fitted in recesses 23a, 23b (bearings, refer to FIG. 2) formed in an inside surface of the outer housing 20. Consequently, the shutter component 30 is rotatable around the rotation axis G with the shaft projections 35a, 35b as the axis.

The shutter part 32 performs opening/closing of the opening 21. As illustrated in FIG. 3, a shape of an outer surface of the shutter part 32 in a cross-section perpendicular to the rotation axis G (that is, a YZ cross-section) is a projecting curved line shape swollen in the direction away from the rotation axis G, and as illustrated in FIG. 1, the shape of the outer surface of the shutter part 32 is a projecting curved surface shape swollen in the direction away from the rotation axis G. A portion closer to the opening 21 of the outer housing 20 has also the projecting curved surface shape swollen in the same direction, and when the shutter component 30 rotates, the shutter part 32 moves along a curved surface of the outer housing 20.

As illustrated in FIG. 3, a distance D1 between an outer surface at one end 32a of the shutter part 32 on an opening direction, and the rotation axis G is longer than a distance D2 between an outer surface at one end 32b of the shutter part 32 on a closing direction, and the rotation axis G. More specifically, the distance between the outer surface of the shutter part 32 and the rotation axis G is gradually shortened from the one end 32a of the shutter part 32 on the opening direction toward the one end 32b of the shutter part 32 on the closing direction.

The shutter component 30 is made of, for example, resin, and includes at least one material of polyoxymethylene (POM), nylon, and high density polyethylene (HDPE). The shutter part 32 shields light emitted from the optical fibers in a state of being closed. Therefore, the transmittance of the shutter part 32 to light of a wavelength of 800 nm to 1600 nm is, for example, 0% to 50%.

Figure 4:
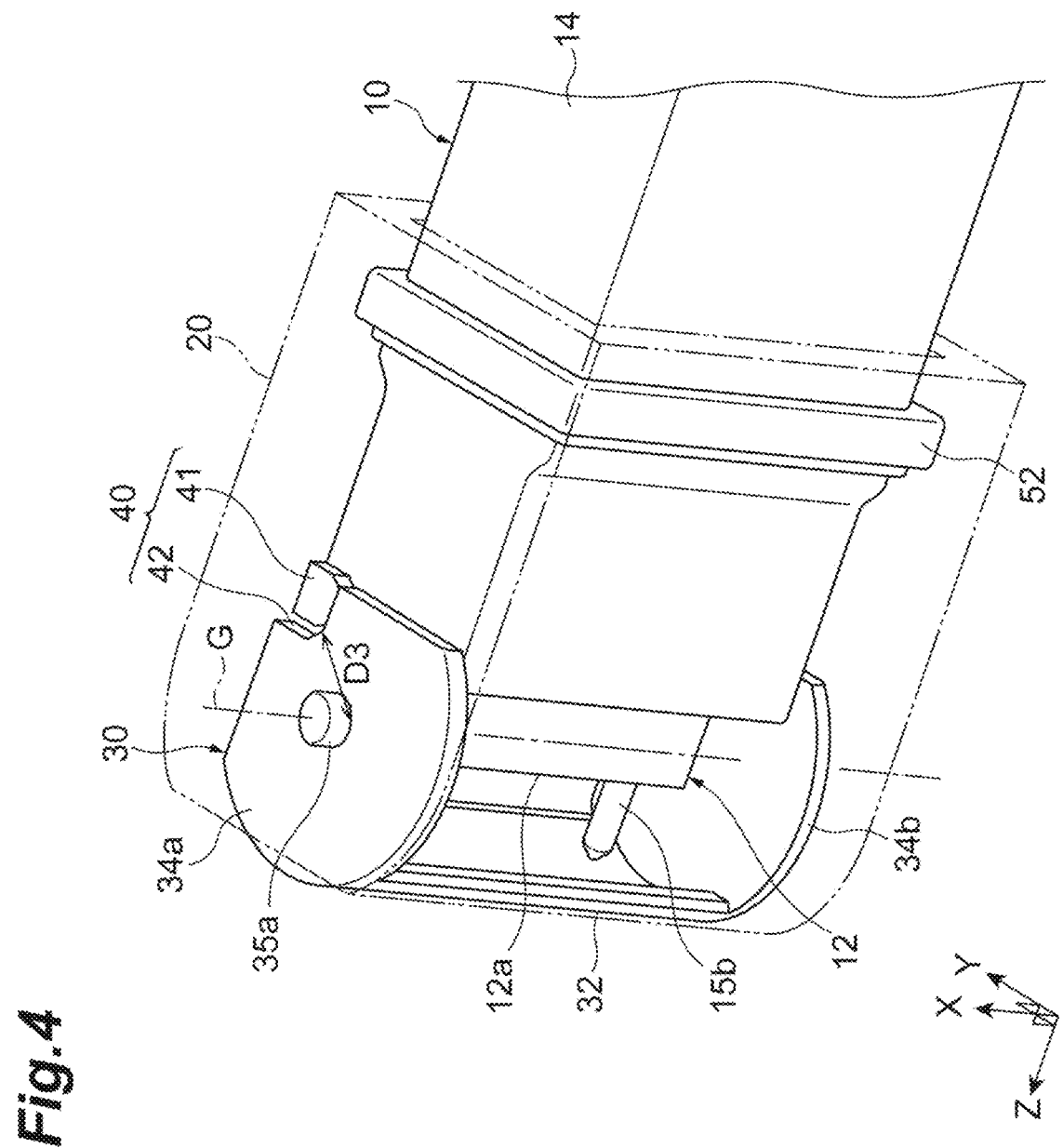
FIG. 4 is a perspective view for illustrating a configuration of a linkage mechanism of the optical connector according to the first embodiment, and illustrates a case in which the shutter component is in a closed state.
Figure 5:
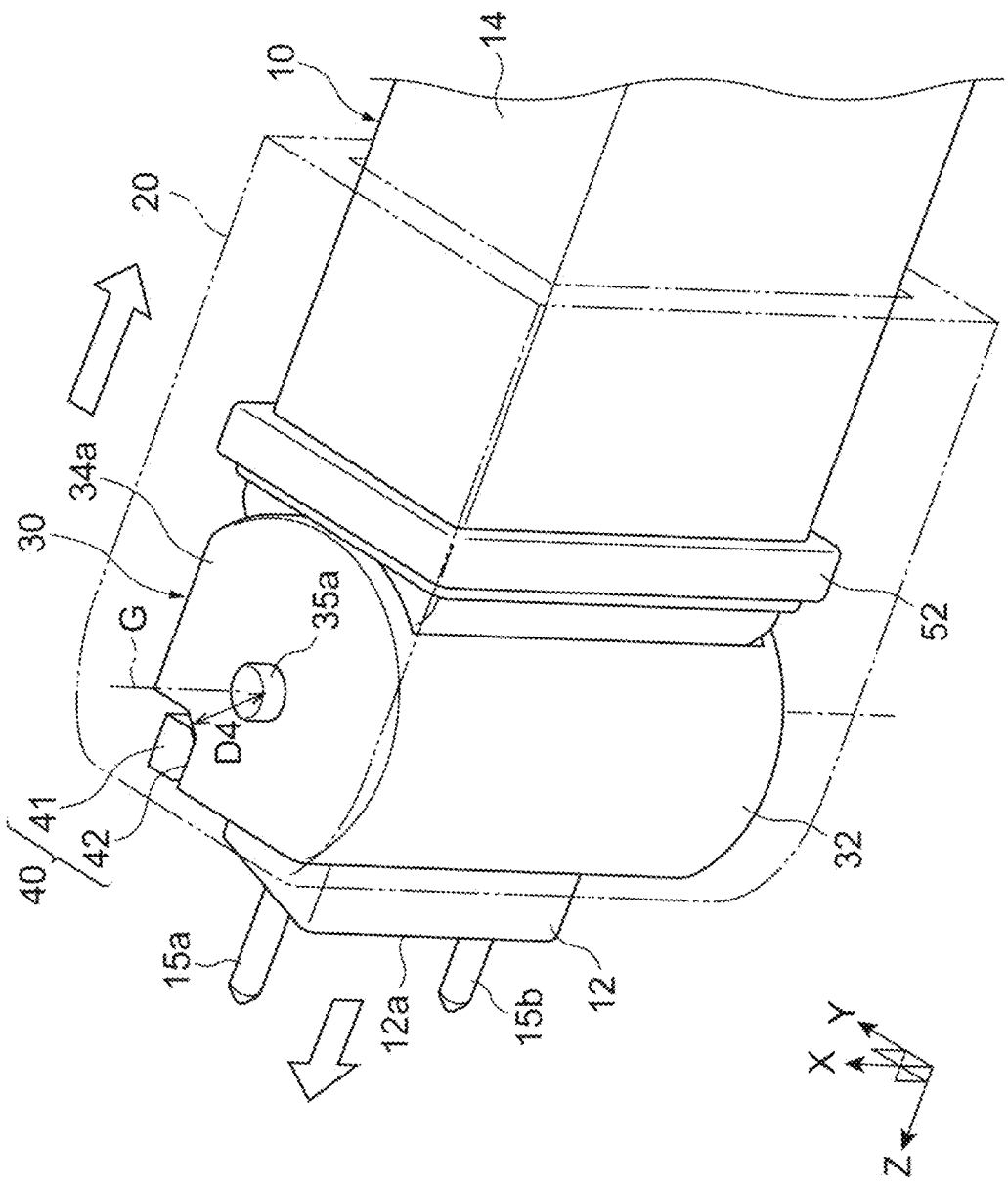
FIG. 5 is a perspective view for illustrating the configuration of the linkage mechanism of the optical connector according to the first embodiment, and illustrates a case in which the shutter component is in an open state.

Herein, the optical connector 1A further comprises a linkage mechanism. The linkage mechanism rotates the shutter component 30 in conjunction with movement of the outer housing 20 backward in the Z direction with respect to the optical connection component 10, and transfer the shutter component 30 from a closed state to an open state. FIG. 4 and FIG. 5 each are a perspective view for illustrating a configuration of a linkage mechanism 40 of this embodiment, and the optical connection component 10 and the shutter component 30 are illustrated by solid lines, and the outer housing 20 is illustrated by a virtual line. FIG. 4 illustrates a case in which the shutter component 30 is in a closed state, and FIG. 5 illustrates a case in which the shutter component 30 is in an open state. As illustrated in FIG. 4 and FIG. 5, each linkage mechanism 40 has a projection 41 (linkage projection) and a cutout 42 (linkage cutout). When the cutout 42 can constitute the linkage mechanism together with the projection 41, the cutout 42 may be a hole (linkage hole).

The projection 41 is provided in one of the optical connection component 10 and the shutter component 30 (in the optical connection component 10 in the Fig.). The cutout 42 is provided in the other of the optical connection component 10 and the shutter component 30 (in the shutter component 30 in the Fig.). The cutout 42 has two surfaces orthogonal to each other. One of the surfaces is located on a front side in the Z direction of the projection 41 in the closed state, and is located on a first side (closer to rotation axis G) in the Y direction with respect to the projection 41 in the open state. The other surface is located on the first side (closer to rotation axis G) in the Y direction with respect to the projection 41 in the closed state, and is located on a back side in the Z direction of the projection 41 in the open state. The projection 41 and the cutout 42 are provided at a position shifted in the Y direction with respect to the rotation axis G (shaft projections 35a, 35b) of the shutter component 30, and engage with each other when the outer housing 20 slides in the Z direction with the optical connection component 10. More specifically, when the outer housing 20 slides backward in the Z direction with respect to the optical connection component 10, the one surface of the cutout 42 abuts on the projection 41 to rotate the shutter component 30. Additionally, when the outer housing 20 slides forward in the Z direction with respect to the optical connection component 10, the other surface of the cutout 42 abuts on the projection 41 to rotate the shutter component 30. Thus, rotating force is applied to the shutter component 30.

In an example, a distance between the light incidence/emission end surface 10a and each projection 41 in the Z direction is, for example, 20 mm or less. Additionally, a distance D3 between the rotation axis G and each projection 41 in the closed state (FIG. 4) of the shutter part 32 is equal to a distance D4 between the rotation axis G and the projection 41 in the open state (FIG. 5) of the shutter part 32.

Figure 6:
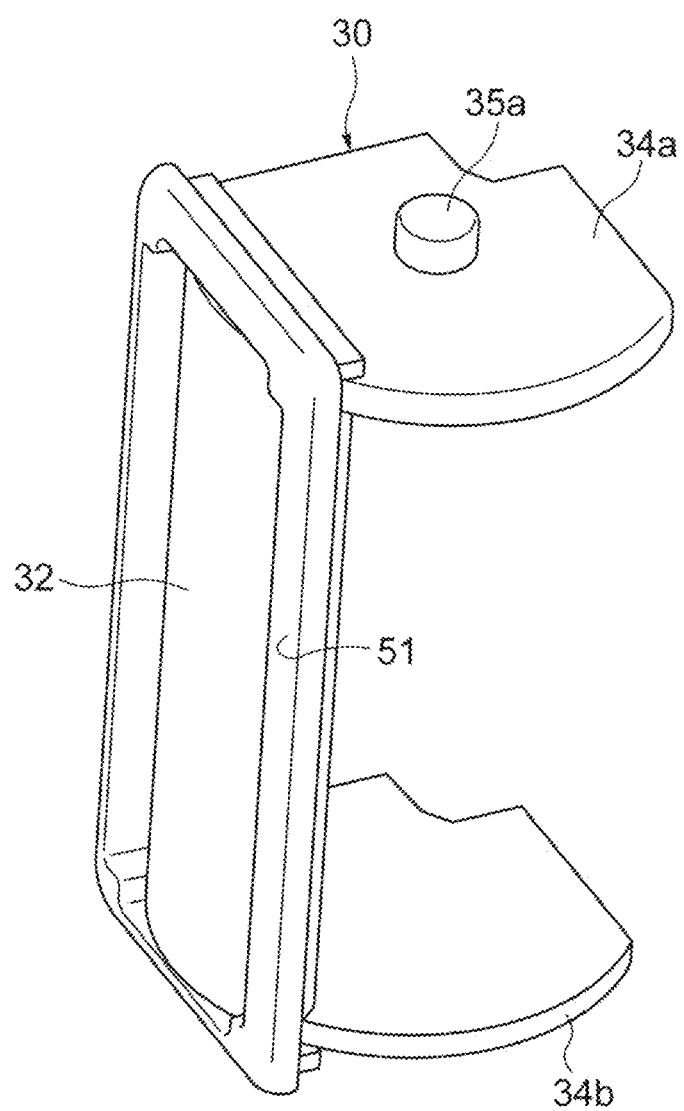
FIG. 6 is a perspective view illustrating an appearance of a sealing member of the optical connector according to the first embodiment.
Figure 7:
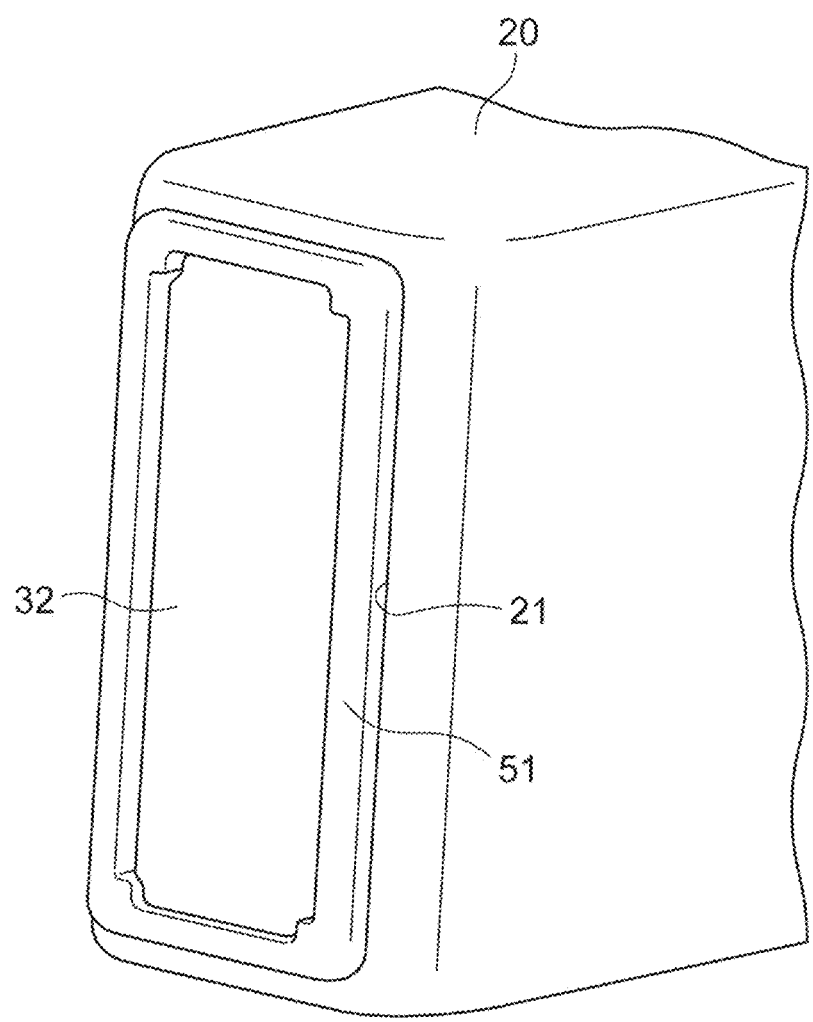
FIG. 7 is a perspective view illustrating a front end of the optical connector according to the first embodiment, and illustrates a state in which a shutter part is closed.
Figure 8:
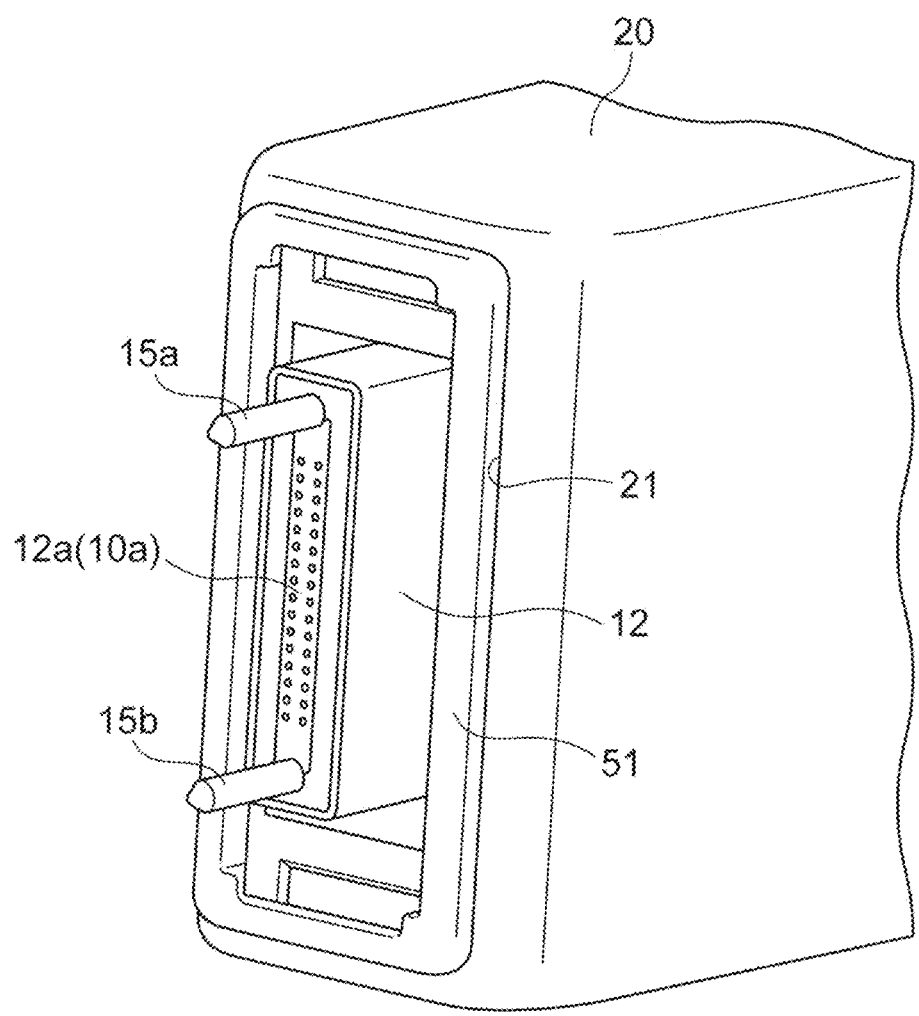
FIG. 8 is a perspective view illustrating the front end of the optical connector according to the first embodiment, and illustrates a state in which the shutter part is opened.

FIG. 6 is a perspective view illustrating an appearance of the sealing member 51, and illustrates the sealing member together with the shutter component 30. FIG. 7 and FIG. 8 each are a perspective view illustrating a front end of the optical connector 1A. FIG. 7 illustrates a state in which the shutter part 32 is closed, and FIG. 8 illustrates a state in which the shutter part 32 is opened. The sealing member 51 is an annular member made of an elastic material, for example, rubber in order to block a gap between the shutter component 30 and the opening 21. As illustrated in FIG. 6 to FIG. 8, the sealing member 51 is in contact with the outer housing 20 over a whole circumference of the opening 21 with no gap. Furthermore, when the shutter part 32 is in the closed state, the sealing member 51 is also in contact with the shutter part 32 over the whole circumference of the opening 21 with no gap. In an example, a part of the sealing member 51 is fitted in the opening 21 of the outer housing 20, so that the sealing member 51 is fixed to the outer housing 20.

FIG. 1 and FIG. 2 are referred again. The sealing member 52 is provided in a gap between the optical connection component 10 and the outer housing 20. The sealing member 52 is in contact with both an outside surface of the optical connection component 10 and the inside surface of the outer housing 20 over a whole circumference of the outer housing 20 near the opening 22. The sealing member 52 is an annular member made of an elastic material, for example, rubber, and is made of the same material as the sealing member 51 in an example. In this embodiment, the sealing member 52 is fixed to the optical connection component 10. More specifically, the sealing member 52 is fitted in a recess formed in an outside surface of the inner housing 14, and stops in the recess by elastic force which the sealing member 52 has. Then, the outer housing 20 and the sealing member 52 mutually slide. The sealing member 52 may be fixed to the outer housing 20. In this case, the optical connection component 10 and the sealing member 52 mutually slide.

In an optical connection structure comprising a pair of optical connectors 1A, in a case in which the optical connectors 1A of this embodiment are used in both one optical connector (first optical connector) and the other optical connector (second optical connector), when these optical connectors 1A are connected to each other, the guide pins 15a, 15b shared by both are mounted on either one of the optical connectors, and a sealing member 51 of the one optical connector 1A and a sealing member 51 of the other optical connector 1A abut on each other over the respective whole circumferences of the openings 21. Then, the outer housing 20 moves backward in the Z direction with respect to the optical connection component 10 by pressing force generated by this abutting. At this time, rotating force is applied to the shutter component 30 by the above linkage mechanism 40, the shutter part 32 is brought into the open state. At the same time, the front end surface 12a of the ferrule 12 projects forward in the Z direction from the opening 21 (refer to FIG. 8).

Effects obtained by the thus described optical connector 1A of this embodiment will be described. When this optical connector 1A is in a non-connection state, the outer housing 20 is located at a front part of the optical connection component 10, and the shutter part 32 closes the opening 21 of the outer housing 20. At this time, the sealing member 51 is in contact with the opening 21 and the shutter part 32 over the whole circumference, and therefore the gap between the shutter part 32 and the opening 21 is blocked. Additionally, the sealing member 52 is in contact with both the outside surface of the optical connection component 10 and the inside surface of the outer housing 20 over the whole circumference of the outer housing 20, and therefore the gap between the optical connection component 10 and the outer housing 20 is also blocked. Consequently, the light incidence/emission end surface 10a is located in a sealed space defined by the shutter part 32, the outer housing 20, and the optical connection component 10. Accordingly, the light incidence/emission end surface 10a can be prevented from being exposed to the outside, and the light incidence/emission end surface 10a can be protected from a foreign matter.

As described above, when this optical connector 1A is connected, the outer housing 20 moves backward in the Z direction with respect to the optical connection component 10 by pressing force from a mating optical connector, for example. Then, the shutter component 30 rotates in conjunction with the movement of the outer housing 20, and the shutter part 32 transfers from a closed state to an open state. At the same time, the light incidence/emission end surface 10a projects forward in the Z direction from the opening 21. Consequently, the light incidence/emission end surface 10a faces a light incidence/emission end surface of the mating optical connector, and can be optically coupled to the light incidence/emission end surface of the mating optical connector. Furthermore, when the connection of the optical connector 1A is disconnected, the outer housing 20 moves forward in the Z direction with respect to the optical connection component 10, the shutter component 30 rotates in conjunction with this, and the shutter part 32 transfers from the open state to the closed state. Thus, according to the optical connector 1A of this embodiment, at the time of the connection, the light incidence/emission end surface 10a is suitably exposed, and at the time of the non-connection state, the periphery of the light incidence/emission end surface 10a is sealed, and dustproof performance can be enhanced.

In a conventional optical connector comprising a shutter mechanism, a large shutter storage space in a state where a shutter is open is needed, and therefore it is difficult to miniaturize the optical connector. On the other hand, in the optical connector 1A, opening/closing of the shutter part 32 is performed by rotating motion of the shutter component 30 itself, and therefore a shutter storage space in an open state can be reduced, and miniaturization of the optical connector is possible.

In the optical connector 1A, the shape of the outer surface of the shutter part 32 in the cross-section perpendicular to the rotation axis G may be the projecting curved line shape swollen in the direction away from the rotation axis G. The distance D1 between the outer surface at the one end of the shutter part 32 on the opening direction, and the rotation axis G may be longer than the distance D2 between the outer surface at the one end of the shutter part 32 on the closing direction, and the rotation axis G. Consequently, when the shutter component 30 rotates, and the shutter part 32 transfers from the closed state to the open state, the shutter part 32 and the sealing member 51 can be separated at an early stage, and friction force at the time of rotation can be reduced. Additionally, even when the shutter part 32 transfers from the open state to the closed state, a state in which the shutter part 32 and the sealing member 51 are separated is kept until a time just before closing, and therefore the shutter part 32 becomes such a shape as to press the sealing member 51, and the opening 21 can be more reliably sealed.

Each linkage mechanism 40 of the optical connector 1A may have the projection 41 provided in one of the optical connection component 10 and the shutter component 30, and the cutout 42 provided in the other of the optical connection component 10 and the shutter component 30, and engaging with the projection 41. In this case, when the outer housing 20 moves in the Z direction, rotating force by engagement of the projection 41 and the cutout 42 is generated in the shutter component 30. Accordingly, the shutter component 30 can be rotated in conjunction with the movement of the outer housing 20 in the Z direction with respect to the optical connection component 10, and be suitably transferred from the closed state to the open state, or from the open state to the closed state.

In the optical connector 1A, the distance between the light incidence/emission end surface 10a and the projection 41 in the Z direction may be 20 mm or less. Consequently, it is possible to reduce the length of the optical connector 1A in the Z direction, and to miniaturize the optical connector 1A.

In the optical connector 1A, the projection 41 may be provided in the optical connection component 10, and the cutout 42 may be provided in the shutter component 30. In this case, the distance D3 between the rotation axis G and the projection 41 in the closed state of the shutter part 32 may be equal to the distance D4 between the rotation axis G and the projection 41 in the open state of the shutter part 32. Consequently, it is possible to reduce the length of the optical connector 1A in the Z direction, and to miniaturize the optical connector 1A.

In the optical connector 1A, the shutter component 30 may include at least one material of POM, nylon, and HDPE. The shutter component 30 includes these materials having no dusting characteristic and being excellent in sliding, so that it is possible to smoothly perform opening/closing of the shutter part 32.

In the optical connector 1A, the transmittance of the shutter part 32 to light of a wavelength of 800 nm to 1600 nm may be 0% to 50%. Consequently, the shutter part 32 can have a light shielding function, and eye safety performance can be enhanced.

In the optical connector 1A, the sealing member 52 may be fixed to the optical connection component 10, and the outer housing 20 and the sealing member 52 may mutually slide. Consequently, it is possible to easily perform assembly of the optical connector 1A. Alternatively, the sealing member 52 may be fixed to the outer housing 20, the optical connection component 10 and the sealing member 52 may mutually slide. Consequently, it is possible to enhance a dustproof property.

In this embodiment, when one optical connector 1A and the other optical connector 1A are connected to each other in the optical connection structure, the sealing member 51 of the one optical connector 1A and the sealing member 51 of the other optical connector 1A abut on each other over the respective whole circumferences of the openings 21, and the outer housing 20 may move backward in the Z direction with respect to the optical connection component 10 by pressing force generated by the abutting. Consequently, the outer housing 20 automatically moves backward in the Z direction with respect to the optical connection component 10 when the one optical connector 1A and the other optical connector 1A are connected, and therefore the shutter part 32 can be automatically brought into the open state, and the light incidence/emission end surface 10a can be projected. Additionally, even in a state in which the optical connectors 1A are connected, the periphery of the light incidence/emission end surface 10a is sealed by both the sealing members 51, and dustproof performance can be enhanced.

Second Embodiment

Now, an optical connector according to a second embodiment of the present invention will be described. The optical connector according to the second embodiment is similar to the optical connector 1A of the first embodiment in basic configurations and motion in a viewpoint of enhancing dustproof performance. However, the optical connector according to the second embodiment is different from the optical connector 1A of the first embodiment in that a shutter component performs linear motion before rotating motion (in a case of transfer from the closed state to the open state), or after rotating motion (in a case of transfer from the open state to the closed state) by the shutter component when a shutter part and a sealing part transfer from a closed state to an open state, and when the shutter part and the sealing part transfer from the open state to the closed state, and dustproof performance is further enhanced. The optical connector according to the second embodiment can also compose an optical connection structure similar to that of the first embodiment.

Figure 9:
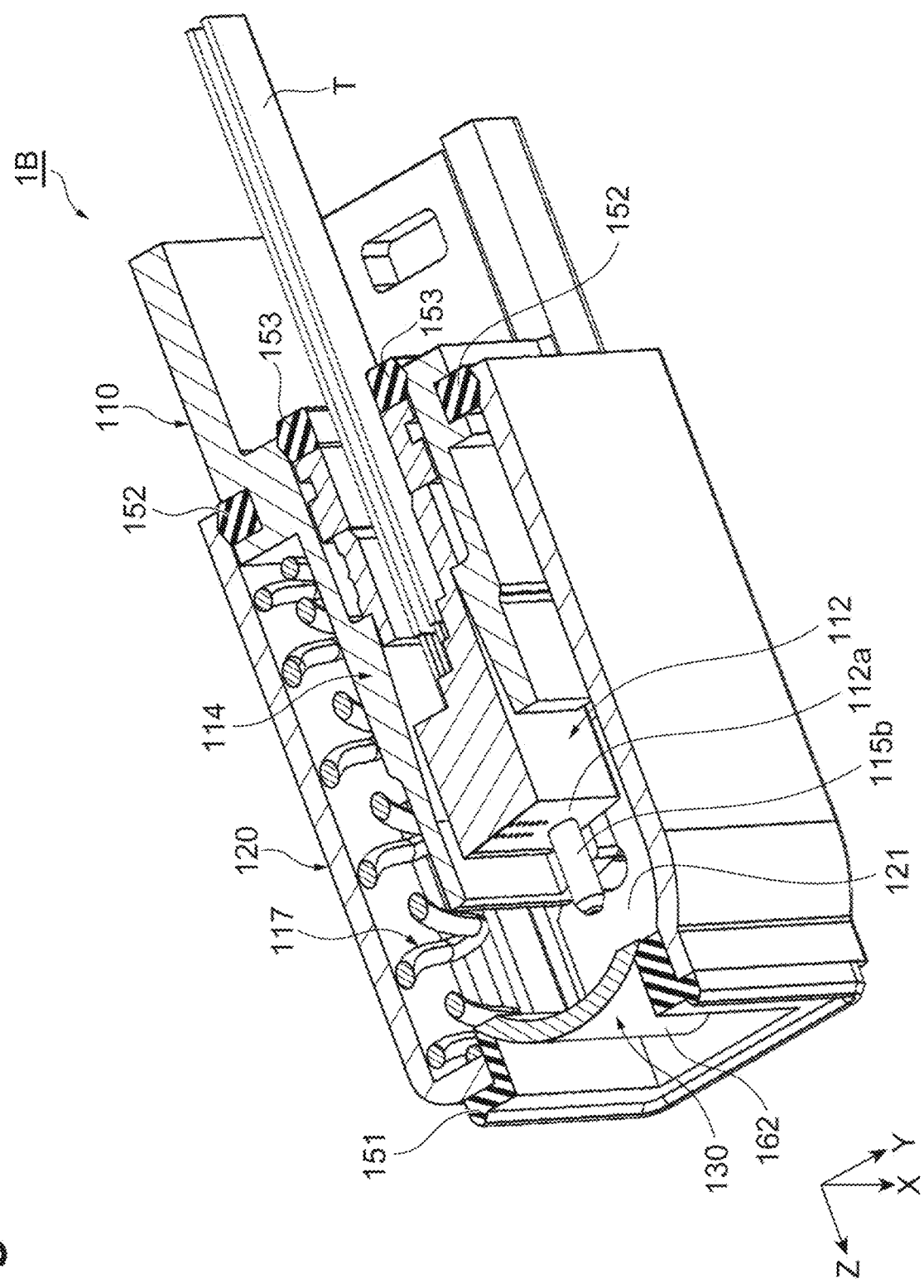
FIG. 9 is a cut-away perspective view illustrating a structure of an optical connector according to a second embodiment, and illustrates a cut-away cross-sectional view along a YZ plane.
Figure 10:
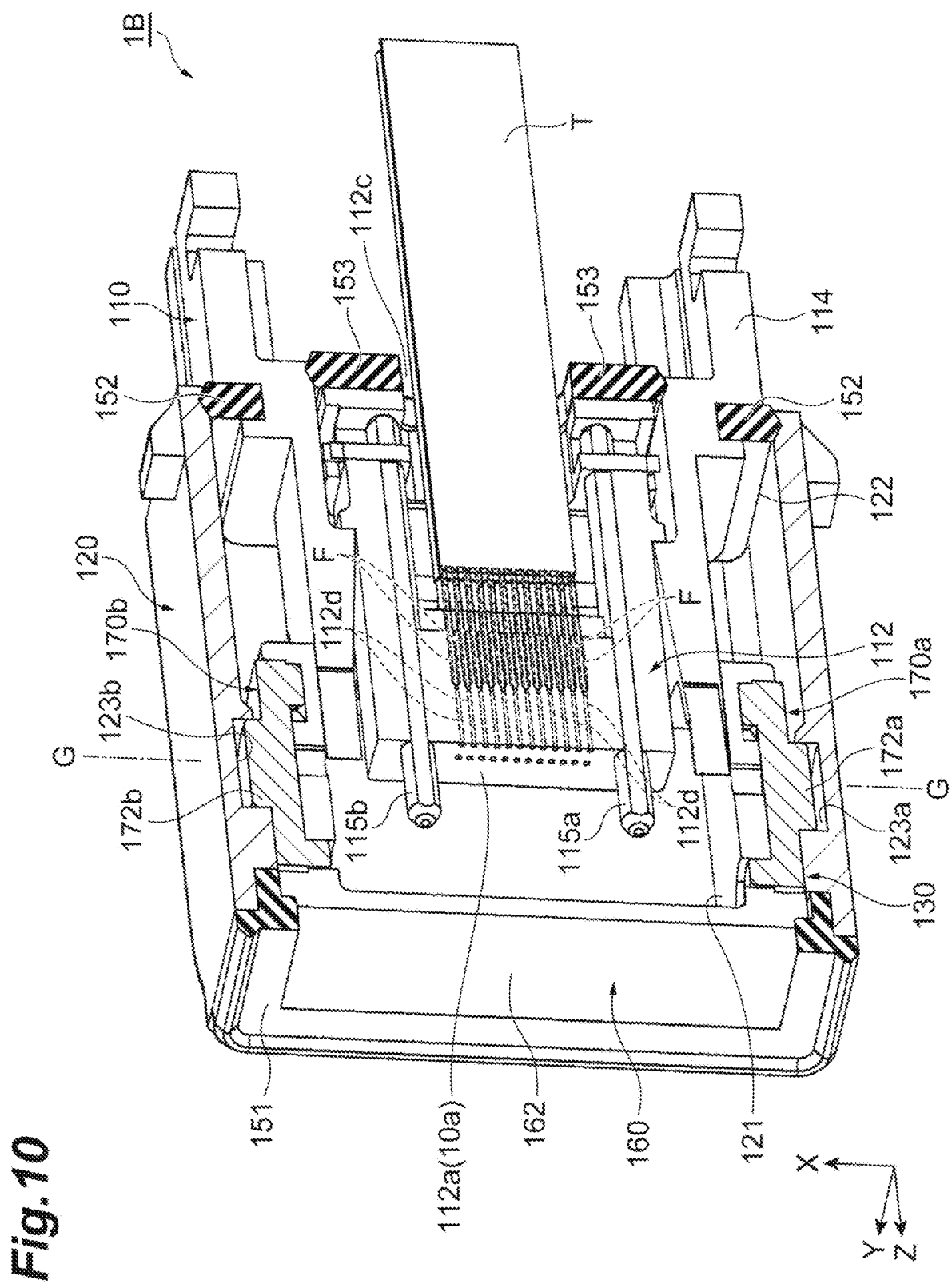
FIG. 10 is another cut-away perspective view illustrating the structure of the optical connector according to the second embodiment, and illustrates a cut-away cross-sectional view along the XZ plane.

FIG. 9 is a cut-away perspective view illustrating the structure of an optical connector according to the second embodiment, and illustrates a cut-away cross-sectional view along a YZ plane. FIG. 10 is another cut-away perspective view illustrating the structure of the optical connector according to the second embodiment, and illustrates a cut-away cross-sectional view along the XZ plane. As illustrated in FIG. 9 and FIG. 10, an optical connector 1B comprises an optical connection component 110, an outer housing 120 (first member), a shutter component 130 (second member), a sealing member 151 (first sealing member), and a sealing member 152 (second sealing member) similarly to the optical connector 1A, and further comprises a sealing member 153 (third sealing member).

The optical connection component 110 has a ferrule 112, an inner housing 114, and a coil spring disposed behind the inner housing 114. The optical connection component 110 may have a pair of guide pins 115a, 115b as necessary. The ferrule 112 and the inner housing 114 have substantially the same configuration and function as the ferrule 12 and the inner housing 14, but are different in that the inner housing 114 is configured to extend up to a front side with respect to a front end of the ferrule 112 along the connection direction (Z direction). A ribbon T having a plurality of optical fibers F is inserted from a fiber introducing port 112c, and the respective optical fibers F are held by holding holes 112d formed toward a front end surface 112a.

The outer housing 120 has an opening 121 in a first end in the Z direction (connection direction), has an opening 122 in a second end, and is slidable (movable) in the Z direction with respect to the optical connection component 110, similarly to the outer housing 20. A spring 117 is provided between the optical connection component 110 and the outer housing 120, and the outer housing 120 can automatically return to an initial position when sliding in the Z direction with respect to the optical connection component 110. Other configuration of the outer housing 120 is substantially similar to that of the outer housing 20.

The shutter component 130 is similar to the shutter component 30 in that the shutter component 130 performs rotating motion with the shaft projection 172a, 172b fitted in recesses 123a, 123b (bearings) of the outer housing 120 with an axis, and performs opening/closing motion of a shutter part 162, but is different in that the shutter component 130 is composed of two kinds of components, namely, a first rotary shutter component (first rotary component) 160 and second rotary shutter components (second rotary components) 170a, 170b. In the shutter component 130, the shutter component 130 is composed of these two kinds of components, so that before the shutter component 130 (first rotary shutter component 160) is rotated around the rotation axis when the shutter part 162 is transferred from a closed state to an open state, the first rotary shutter component 160 is slightly moved backward in the Z direction (retreated) by the second rotary shutter components 170a, 170b. Additionally, in the shutter component 130, after the shutter component 130 (first rotary shutter component 160) is rotated around the rotation axis when the shutter part 162 is transferred from the open state to the closed state, the first rotary shutter component 160 is slightly moved forward in the Z direction (advanced) by the second rotary shutter components 170a, 170b, and the shutter component 130 is pressed against the sealing member 151 to be brought into the closed state.

The sealing member 151 is a member blocking a gap between the shutter component 130 and the opening 121 similarly to the sealing member 51. The sealing member 152 is provided between the optical connection component 110 and the outer housing 120 (in an outer groove of the optical connection component 110 in the example of the Fig.) similarly to the sealing member 52, and blocks a gap between the optical connection component 110 and the outer housing 120 on the opening 122 over a whole circumference. The sealing member 152 may be provided on the outer housing 120. The sealing member 153 blocks a gap between a rear part of the ferrule 112, and the inner housing 114 covering and holding the ferrule 112, and prevents dust from the back side of the ferrule 112 from entering the front end surface 112a of the ferrule 112 provided with a light incidence/emission end surface 10a.

Figure 11:
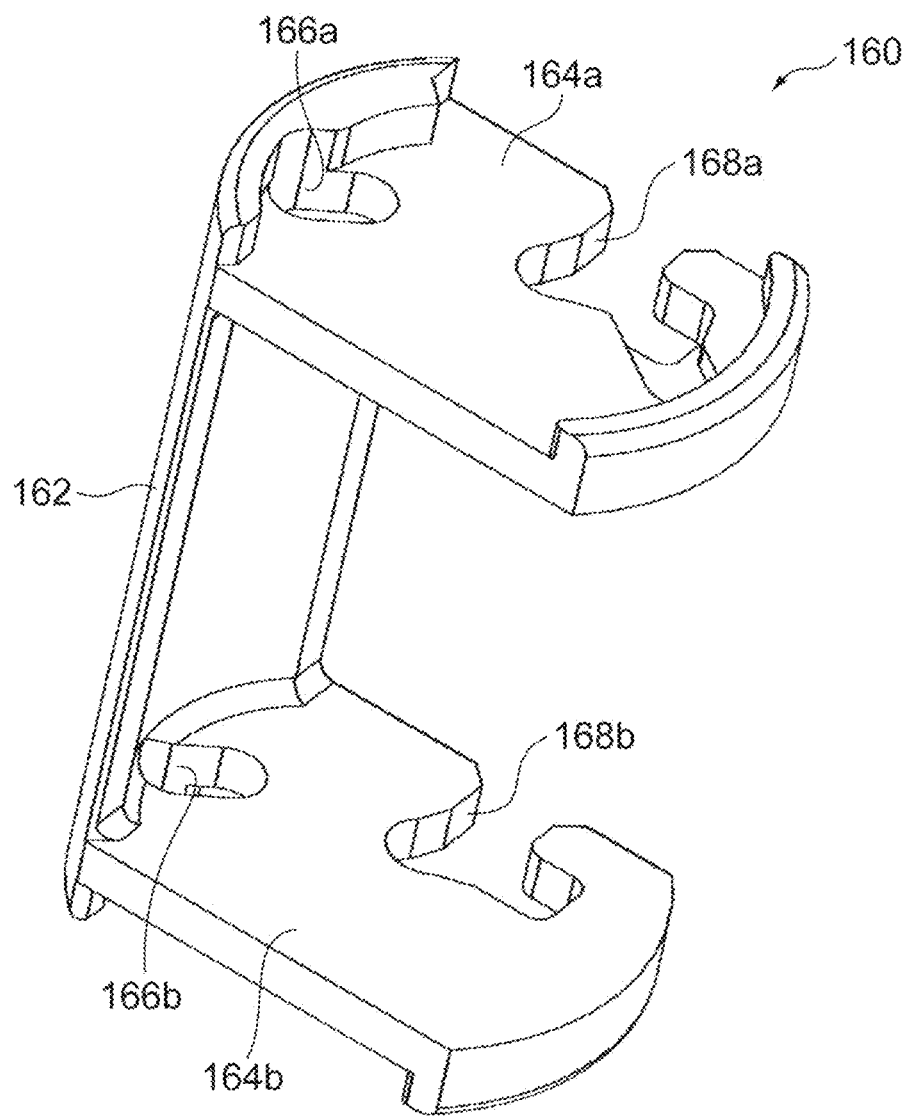
FIG. 11 is a perspective view illustrating an appearance of a first rotary shutter component of the optical connector according to the second embodiment.
Figure 12:
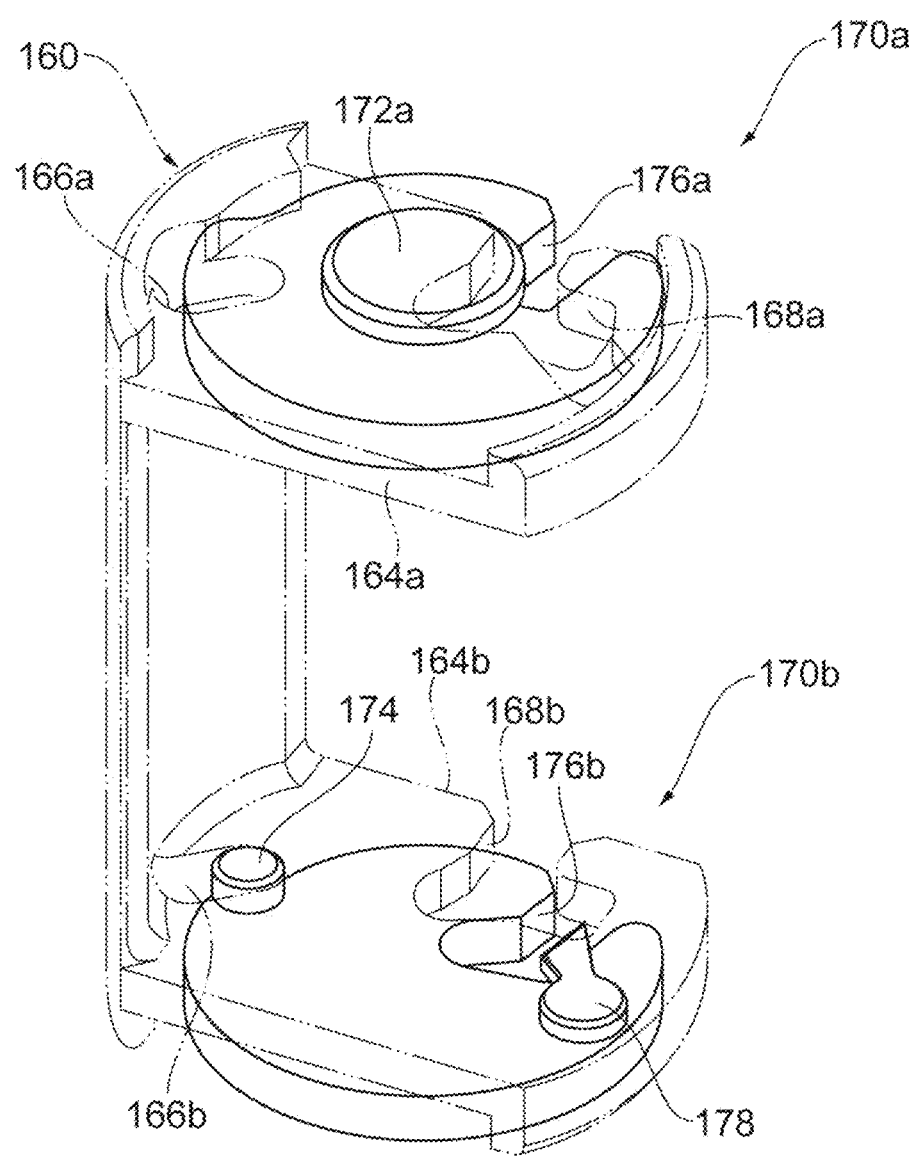
FIG. 12 is a perspective view illustrating an appearance when second rotary shutter components of the optical connector according to the second embodiment are mounted on the first rotary shutter component.

Now, the first rotary shutter component 160 and the second rotary shutter components 170a, 170b configuring the shutter component 130 will be described in more detail with reference to FIG. 11 and FIG. 12. FIG. 11 is a perspective view illustrating the first rotary shutter component. FIG. 12 is a perspective view illustrating an appearance when the second rotary shutter components of the optical connector are attached to the first rotary shutter component.

As illustrated in FIG. 11, the first rotary shutter component 160 has a shutter part 162 similar to the shutter part 32, and support parts 164a, 164b provided in both ends in the X direction (height direction of FIG. 11) of the shutter part 162. The support parts 164a, 164b each have a plate shape extending along the YZ plane, and are provided with holes 166a, 166b near the shutter part 162, and cutouts 168a, 168b provided on the end separated from the shutter part 162. The holes 166a, 166b each have a long hole shape extending in the direction inclined to the Z direction (connection direction). The cutouts 168a, 168b have shapes obtained by connecting two substantially circular holes and being cut out toward side parts of the support parts 164a, 164b.

As illustrated in FIG. 12, the second rotary shutter components 170a, 170b each have a substantially disk shape, and have a plane-symmetrical shape with respect to the YZ plane. The second rotary shutter component 170a has a shaft projection 172a forming a rotation axis G, a projection 174 provided on an edge of a surface opposite to the shaft projection 172a, a cutout 176a opened toward a surface on which the projection 174 is installed, and corresponding to a projection 141 of the optical connection component 110 (refer to FIG. 14), and a projection 178 provided adjacent to the cutout 176a. Similarly, the second rotary shutter component 170b has a shaft projection 172b (refer to FIG. 10) forming the rotation axis G, a projection 174 provided on an edge of a surface opposite to the shaft projection 172b, a cutout 176b opened toward a surface on which the projection 174 is installed, and corresponding to a projection 141 of the optical connection component 110 (refer to FIG. 14), and a projection 178 provided adjacent to the cutout 176b. The shaft projection 172a, 172b have similar functions to the shaft projections 35a, 35b of the shutter component 30, and are fitted in the recesses (bearing) 123a, 123b (refer to FIG. 10) formed in an inside surface of the outer housing 120. Consequently, the shutter component 130 including the second rotary shutter components 170a, 170b is rotatable around the rotation axis G with the shaft projection 172a, 172b as the axis.

In a case in which the second rotary shutter components 170a, 170b are combined with the first rotary shutter component 160, the respective projections 174 of the second rotary shutter components 170a, 170b are disposed in the holes 166a, 166b of the first rotary shutter component. Additionally, a pair of the projections 141 of the optical connection component 110 are disposed in the cutouts 168a, 168b of the first rotary shutter component 160, and projecting portions projecting from the cutouts 168a, 168b in the respective projections 141 disposed in the cutouts 168a, 168b of the first rotary shutter component 160 are further disposed in the cutouts 176a, 176b of the second rotary shutter component 170. The respective projections 178 are stored in the cutouts 168a, 168b. In the support parts 164a, 164b of the first rotary shutter component 160, since the second rotary shutter components 170a, 170b are combined to upper parts (outsides) of the support parts 164a, 164b of the first rotary shutter component 160, areas except both ends of the support parts 164a, 164b are thinned, and surface areas except the shaft projection 172a, 172b as axes in the outer surfaces of the second rotary shutter components 170a, 170b forum flat surfaces along with frame parts at both ends of the support parts 164a, 164b. Additionally, position shift in the YZ plane of the second rotary shutter components 170a, 170b is suppressed by the frame parts at these both ends.

Figure 13:
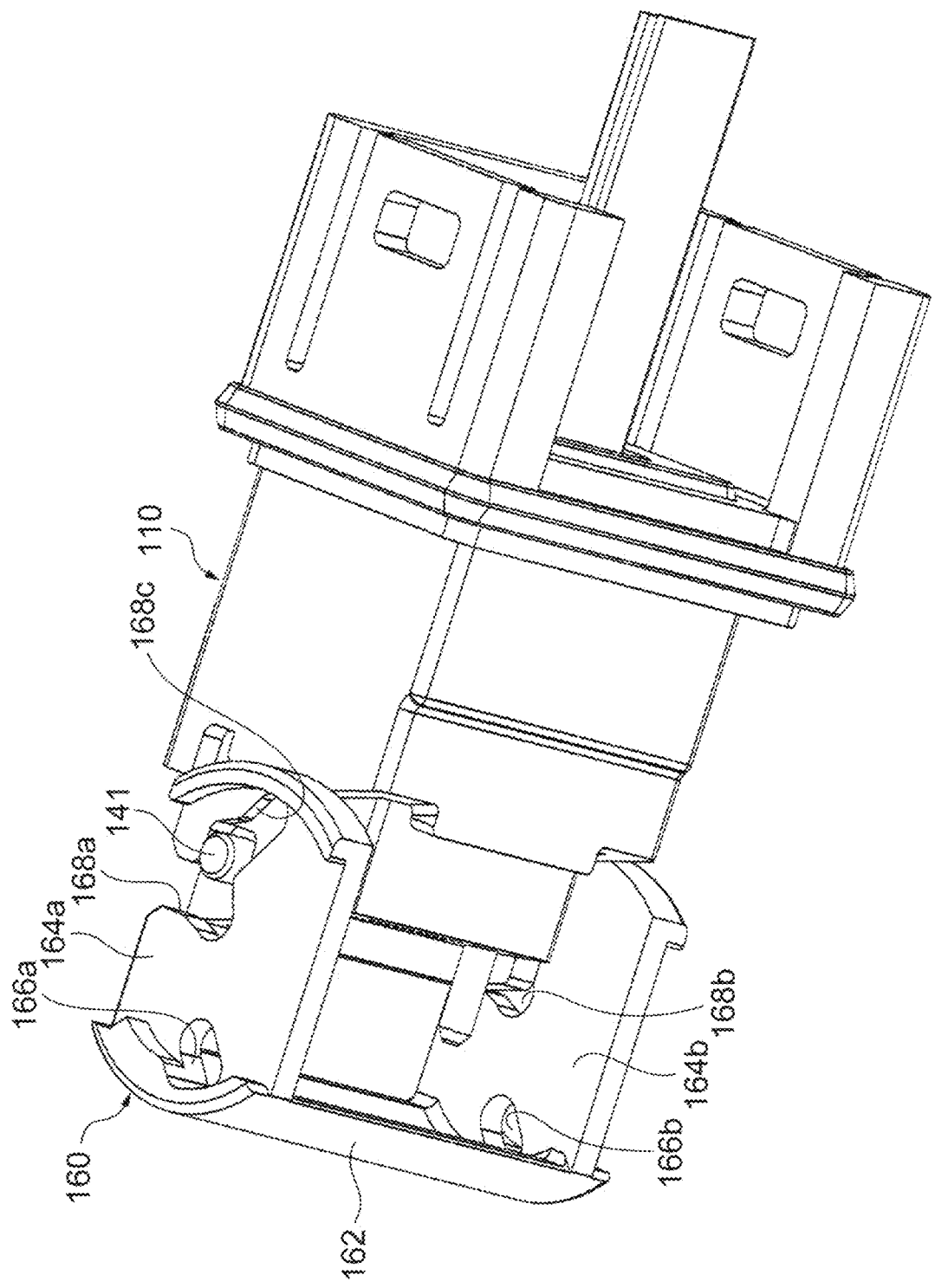
FIG. 13 is a perspective view illustrating a state in which the first rotary shutter component is attached to an optical connection component of the optical connector according to the second embodiment.
Figure 14:
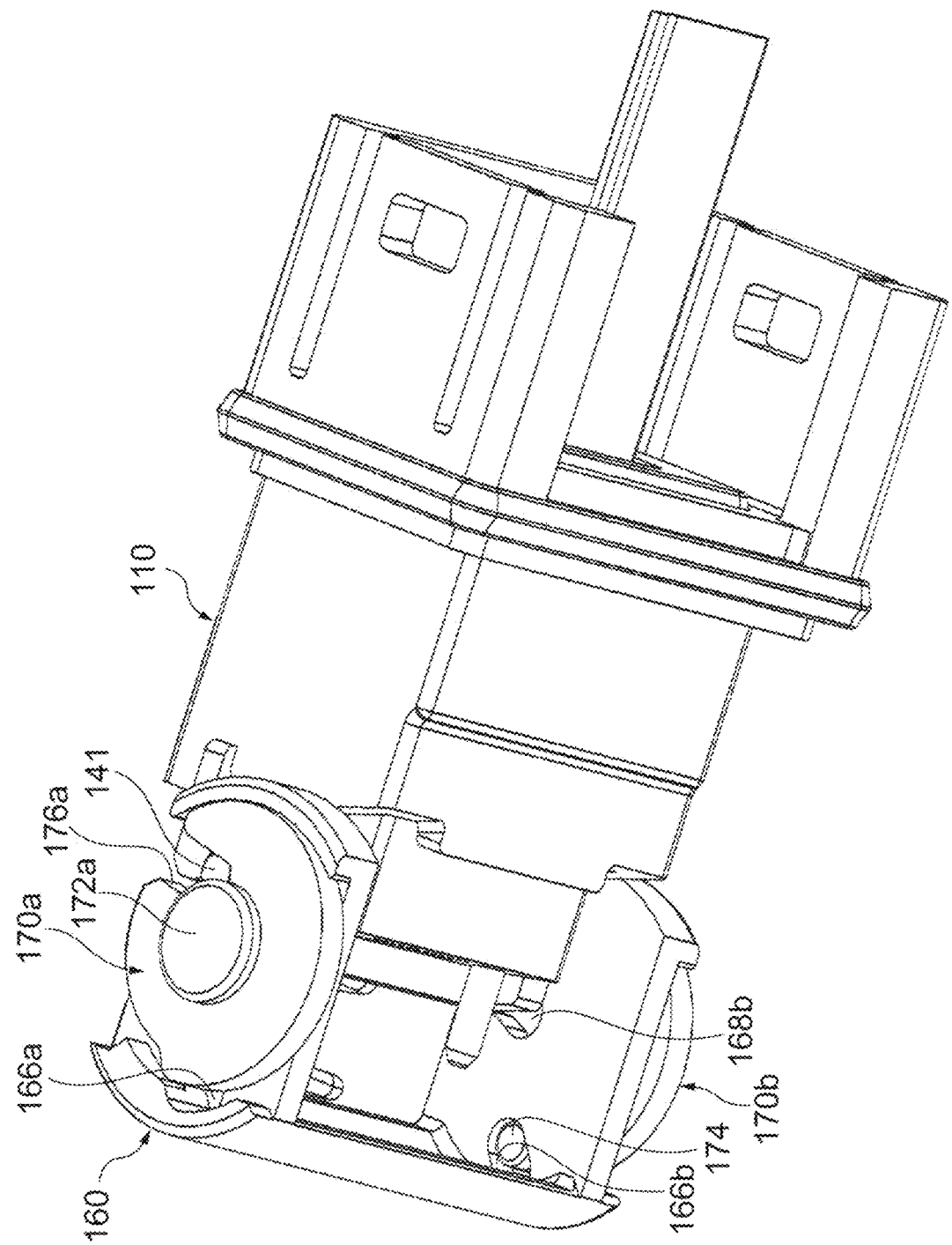
FIG. 14 is a perspective view illustrating a state in which the second rotary shutter components are further attached to the configuration illustrated in FIG. 13.

Now, a form in which the first rotary shutter component 160 and the second rotary shutter components 170a, 170b of the shutter component 130 is combined with the optical connection component 110 will be described with reference to FIG. 13 and FIG. 14. FIG. 13 is a perspective view illustrating a state in which the first rotary shutter component 160 is attached to the optical connection component 110. FIG. 14 is a perspective view illustrating a state in which the second rotary shutter components 170a, 170b are further attached to the configuration illustrated in FIG. 13.

As illustrated in FIG. 13, the first rotary shutter component 160 is attached to the optical connection component 110 in such a way that the two projections 141 of the optical connection component 110 are located in the cutouts 168a, 168b of the first rotary shutter component 160. At this time, each projection 141 is disposed so as to be located in a rear hole 168c of the two holes of each of the cutouts 168a, 168b. Then, the second rotary shutter components 170a, 170b are further mounted outside the first rotary shutter component 160 attached to the optical connection component 110 as illustrated in FIG. 14. At this time, the respective projections 174 of the second rotary shutter components 170a, 170b are located in the holes 166a, 166b of the first rotary shutter component 160, and the respective projections 141 located in the cutouts 168a, 168b of the first rotary shutter component 160, and partially projecting from the upper parts are disposed so as to be located in the cutouts 176a, 176b of the second rotary shutter components 170a, 170b. Additionally, the respective projections 178 of the second rotary shutter components 170a, 170b are stored in the cutouts 168a, 168b of the first rotary shutter component 160.

Figure 15:
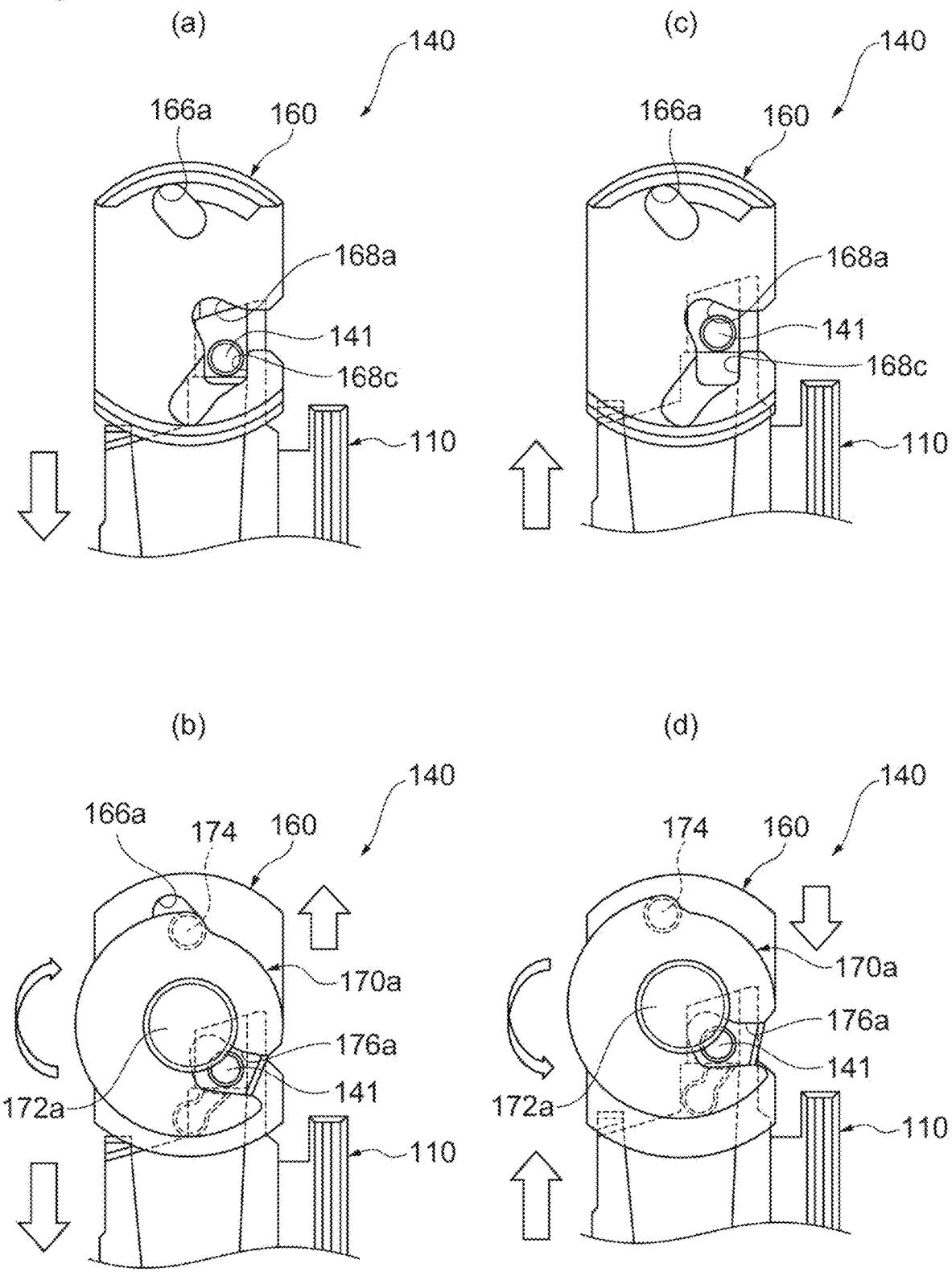
FIG. 15 is a schematic plan view illustrating motion of the optical connection component, the first rotary shutter component, and the second rotary shutter components when the shutter component is opened/closed.

Motion by a linkage mechanism 140 of the shutter component 130 having the above configuration and location configuration will be described with reference to FIG. 15 and FIG. 16. FIG. 15 is a schematic plan view illustrating motion of the optical connection component 110, the first rotary shutter component 160, and the second rotary shutter components 170a when the shutter component is opened/closed. An (a) part in FIG. 15 omits the second rotary shutter component 170a, and illustrates a closed state of the shutter component, a (b) part illustrates a closed state of the shutter component when the second rotary shutter component 170a is mounted, a (c) part omits the second rotary shutter component 170a, and illustrates a state just after the shutter component transfers to an open state, and a (d) part illustrates a state just after the shutter component transfers to the open state when second rotary shutter component 170a is mounted. Motion of the second rotary shutter component 170b is similar to that illustrated in FIG. 15.

As illustrated in the (a) part and the (b) part of FIG. 15, in the closed state of the shutter component, the projection 141 is located in the rear hole 168c of the cutout 168a of the first rotary shutter component 160, and the cutout 176a of the second rotary shutter component 170a. Additionally, the projection 174 of the second rotary shutter component 170a is located on the end separated from the shutter part 162 of the hole 166a of the first rotary shutter component 160. Then, when the optical connection component 110 moves forward in the Z direction (connection method) with respect to the outer housing 120, and force moving forward is applied to the second rotary shutter component 170a having the shaft projection 172a by following the forward movement of the optical connection component 110. At this time, in the second rotary shutter component 170a, the shaft projection 172a is fitted to the outer housing 120 in a state of being rotatable, and therefore in the second rotary shutter component 170a, the force is converted into illustrated force of rotating counterclockwise, as illustrated in the (c) part and the (d) part of FIG. 15, and the second rotary shutter component 170a is slightly rotated. Then, while transmitting force of rotating motion to the hole 166a of the first rotary shutter component 160 by this slight rotation of the second rotary shutter component 170a, the projection 174 moves so as to slide (slip) in the forward oblique direction in the hole 166a. By this movement, the first rotary shutter component 160 slightly moves backward (retreats) in the Z direction (connection direction). By this movement, the first rotary shutter component 160 separates from the sealing member 151. (refer to an (a) part of FIG. 16 and a (b) part of FIG. 16).

Figure 16:
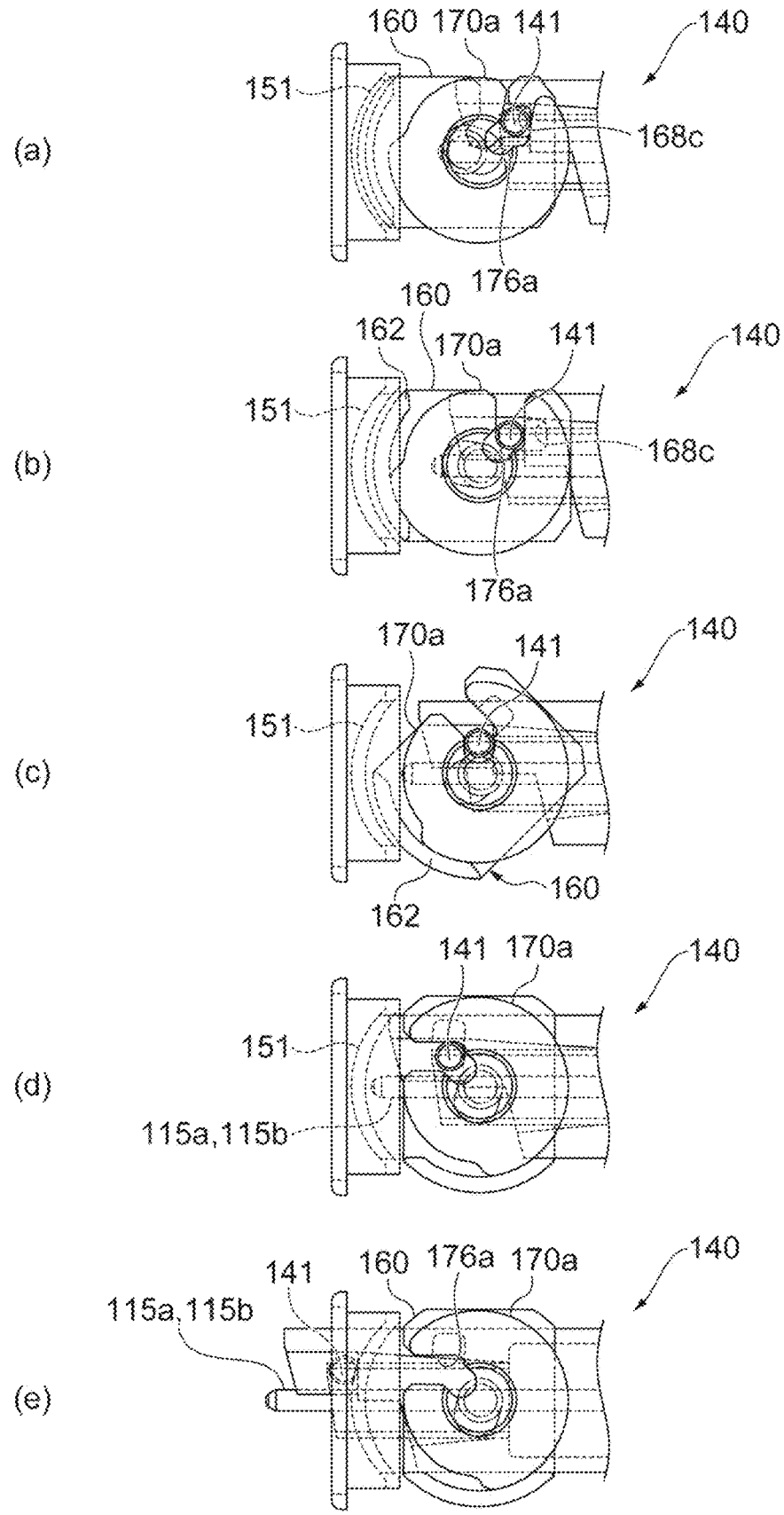
FIG. 16 is a schematic plan view illustrating motion of the optical connection component, the first rotary shutter component, and the second rotary shutter components when the shutter component is opened/closed.
Figure 17:
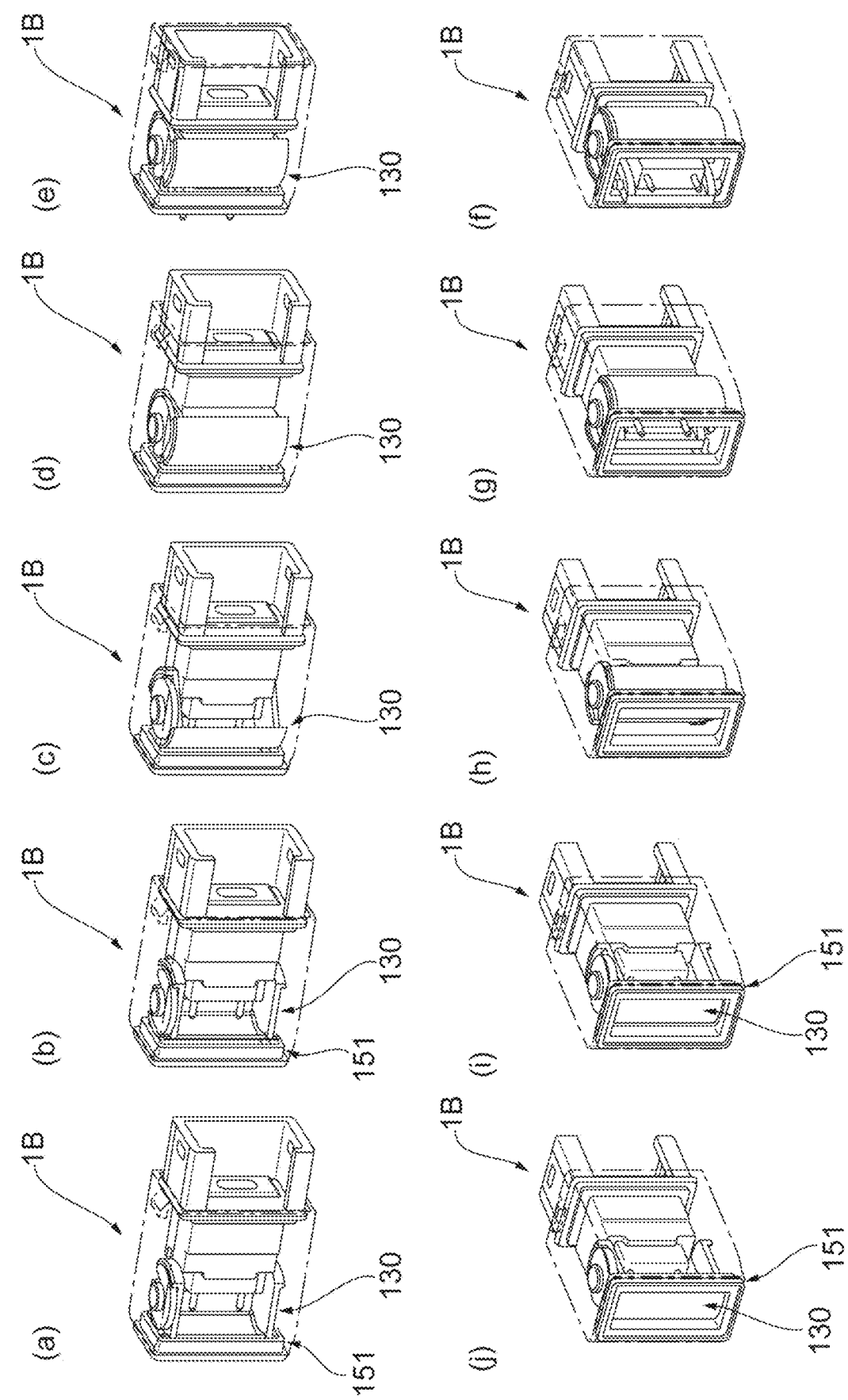
FIG. 17 is a perspective view illustrating the optical connector when the shutter component is opened/closed.

Thereafter, when the optical connection component 110 further moves forward in the Z direction, the projection 141 further moves forward in the Z direction in the cutout 168a of the first rotary shutter component 160 and the cutout 176a of the second rotary shutter component 170a, and rotates the first rotary shutter component 160 and the second rotary shutter component 170a of the shutter component 130 integrally counterclockwise similarly to the opening/closing motion of the shutter component 30 in the optical connector 1A (refer to a (c) part to an (e) part of FIG. 16). The second rotary shutter component 170b having a symmetrical shape with the second rotary shutter component 170a performs movement and rotation similar to the above. By this rotation, the shutter part 162 is transferred to the open state so as to be located at a side part of the outer housing 120 along a curved surface of the outer housing 120, and the front end surface 112a of the ferrule 112 projects forward in the Z direction from the opening 121. The projections 141 in this second embodiment corresponds to the projections 41, the cutouts 168a, 168b and the cutouts 176a, 176b correspond to the cutouts 42, the projections 141, the cutouts 168a, 168b, and the cutouts 176a, 176b configure the linkage mechanism 140, and the shutter component 130 is rotated in conjunction with the movement of the outer housing 120 backward in the Z direction with respect to the optical connection component 110, and is transferred from the closed state to the open state. The linkage mechanism 140 may include the holes 166a, 166b and the projections 174. An (a) part to an (e) part of FIG. 17 each are a perspective view illustrating a state of transfer from a closed state to an open state in the optical connector 1B, and illustrate such movement that the shutter component 130 retreats once in the (a) part to the (b) part of FIG. 17, and thereafter the shutter component 130 rotates around the rotation axis G to be brought into the open state in the (c) part to the (e) part of FIG. 17.

On the other hand, when the optical connector 1B transfers from the open state to the closed state, movement reverse to the above movement is performed, the first rotary shutter component 160 and the second rotary shutter components 170a, 170b are integrally rotate around the rotation axis, and thereafter the first rotary shutter component 160 is slightly moved forward in the Z direction. Consequently, the first rotary shutter component 160 is pressed against the sealing member 151 to be brought into the closed state. An (f) part to a (j) part of FIG. 17 each are a perspective view illustrating a state of transfer from an open state to a closed state in such an optical connector 1B, and illustrate such movement that the shutter component 130 rotates around the rotation axis G to move toward the closed state in the (f) part to the (j) part of FIG. 17, and thereafter the shutter component 130 slightly advances in the Z axis direction to come into contact with the sealing member 151, and is brought into the closed state in the (i) part to the (j) part of FIG. 17. Additionally, the projections 141 in this second embodiment correspond to the projections 41, and therefore in an example, a distance between the light incidence/emission end surface 10a provided in the front end surface 112a of the ferrule 112 and each projection 141 in the Z direction may be, for example, 20 mm or less. Consequently, it is possible to reduce the length of the optical connector 1B in the Z direction, and to miniaturize the optical connector 1B.

As described above, in the optical connector 1B according to the second embodiment, in addition to enabling effects similar to those of the optical connector 1A according to the first embodiment, the shutter component 130 has the first rotary shutter component 160 capable of rotating around the rotation axis, and the second rotary shutter components 170a, 170b for moving the first rotary shutter component 160 backward in the connection direction before the first rotary shutter component 160 is rotated around the rotation axis when the shutter part 162 is transferred from the closed state to the open state. Consequently, the first rotary shutter component 160 having the shutter part 162 once retreats backward in the connection direction before rotating, and it is possible to suppress adhesion of dust to a ferrule end surface or the like at the time of motion for fitting to other connector, the dust being adhered to the shutter part 162 (for example, a surface thereof), and then being detached in a contact area with the sealing member 151 at the time of rotation of the shutter component 130.

The second rotary shutter components 170a, 170b also can move the first rotary shutter component 160 forward in the connection direction after the first rotary shutter component 160 is rotated around the rotation axis when the shutter part 162 is transferred from the open state to the closed state. Consequently, when dust adhered to the shutter part 162 is removed in the contact area with the sealing member 151, and the optical connector 1B returns to a sealed state, adhesion of the dust to the inside of the connector such as the ferrule end surface can be suppressed.

The second rotary shutter components 170a, 170b can move the first rotary shutter component 160 forward or backward along the connection direction in conjunction with movement of the outer housing 120 along the connection direction with respect to the optical connection component 110. Consequently, it is possible to move the first rotary shutter component 160 of the shutter component 130 without performing motion other than the movement of the outer housing 120, and operation of the optical connector 1B is facilitated.

The second rotary shutter components 170a, 170b each have a structure in which the linear movement of the outer housing 120 along the connection direction is converted into the rotating motion, and the first rotary shutter component 160 is slightly moved forward or backward along the connection direction by the motion conversion by these structures. Consequently, it is possible to more reliably prevent dust adhered to the shutter part 162 from being adhered to the ferrule end surface or the like.

The second rotary shutter components 170a, 170b include shaft projections 172a, 172b (shafts) rotatably mounted in the recesses 123a, 123b of the outer housing 120, projections 174 provided on the surfaces opposite to the shaft projection 172a, 172b, and the cutouts 176a, 176b corresponding to the projections 141 of the optical connection component 110. The first rotary shutter component 160 includes the holes 166a, 166b corresponding to the projections 174 of the second rotary shutter components 170a, 170b, and having long hole shapes extending so as to incline to the connection direction, and the cutouts 168a, 168b corresponding to the projections 141 of the optical connection component 110. The projections 141 of the optical connection component 110 are located in the cutouts 168a, 168b of the first rotary shutter component 160 and the cutouts 176a, 176b of the second rotary shutter component 170, and the respective projections 174 of the second rotary shutter components 170a, 170b are located in the holes 166a, 166b of the first rotary shutter component 160. Consequently, it is possible to more reliably prevent dust adhered to the shutter part 162 from being adhered to the ferrule end surface or the like.

In the optical connector 1B, similarly to the first embodiment, the distance between the light incidence/emission end surface 10a and each projection 141 in the Z direction may be, for example, 20 mm or less. Consequently, it is possible to reduce the length of the optical connector 1B in the Z direction, and to miniaturize the optical connector 1B.

In the optical connector 1B, similarly to the first embodiment, the optical connection component 110 may have the ferrule 112 having the light incidence/emission end surface 10a on the front side in the connection direction, and the inner housing 114 covering and holding the ferrule 112, and the optical connector 1B may further comprise the sealing member 153 in contact with both the ferrule 112 and the inner housing 114 on the back side in the connection direction. Consequently, dust from the back side of the ferrule 112 can be prevented from entering the front end surface 112a of the ferrule 112 provided in the light incidence/emission end surface 10a.

Third Embodiment

Now, an optical connector according to a third embodiment of the present invention will be described. The optical connector according to this embodiment is similar to the optical connector 1B of the second embodiment in basic configurations and motion in a viewpoint of enhancing dustproof performance, but is different in that the optical connector further comprising a guide component for more smoothly performing rotating motion or linear motion of the shutter component. The optical connector according to the third embodiment can also compose an optical connection structure similar to that of the first embodiment.

Figure 18:
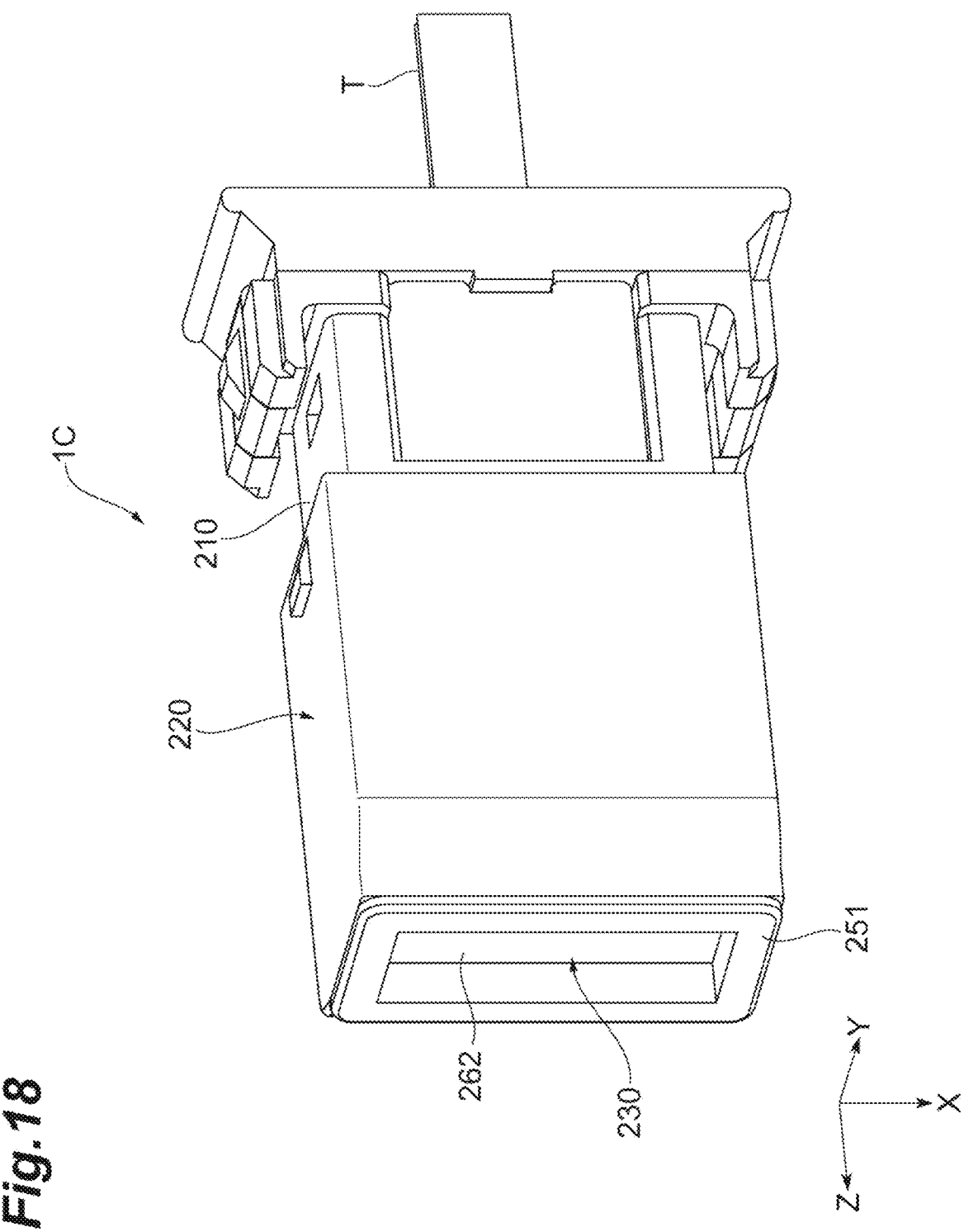
FIG. 18 is a perspective view of an optical connector according to a third embodiment, and illustrates a state in which a shutter is closed.
Figure 19:
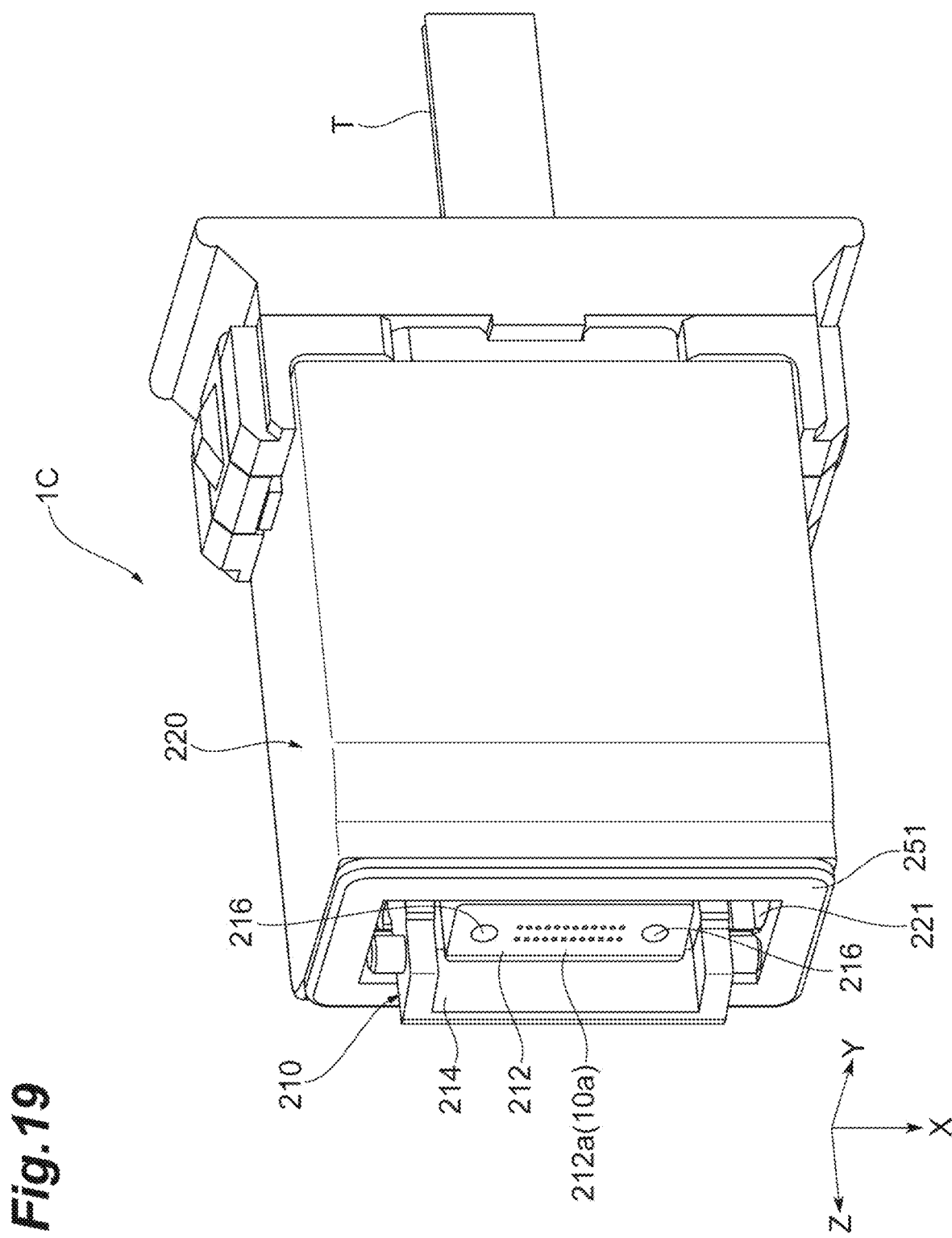
FIG. 19 is a perspective view of the optical connector according to the third embodiment, and illustrates a state in which the shutter is opened and a light incidence/emission end surface of a ferrule projects.

FIG. 18 is a perspective view of the optical connector according to the third embodiment, and illustrates a state in which a shutter is closed. FIG. 19 is a perspective view of the optical connector according to the third embodiment, and illustrates a state in which the shutter is opened and a light incidence/emission end surface of a ferrule projects. In an optical connector 1C, as illustrated in FIG. 18, an optical connection component 210 holding a ribbon T is inserted from a back side in the connection direction (Z direction) of a square cylindrical shaped outer housing 220. On a front side in the connection direction of the outer housing 220, a shutter component 230 having a shutter part 262 for preventing entering of dust to the inside, and a sealing member 251 are provided. In the optical connector 1C, similarly to the second embodiment, the outer housing 220 is slidable in the connection direction with respect to the optical connection component 210, and as illustrated in FIG. 19, the outer housing 220 slides backward in the connection direction, so that a ferrule 212 (light incidence/emission end surface 10a) and an inner housing 214 of the optical connection component 210 project from an opening 221 of the outer housing 220 to the outside. In the optical connector 1C illustrated in FIG. 19, a pair of holes 216 for guide pins, into which pins of an connected optical connector are introduced, are provided. The optical connector 1C may comprise guide pins similarly to the second embodiment and the like.

Figure 20:
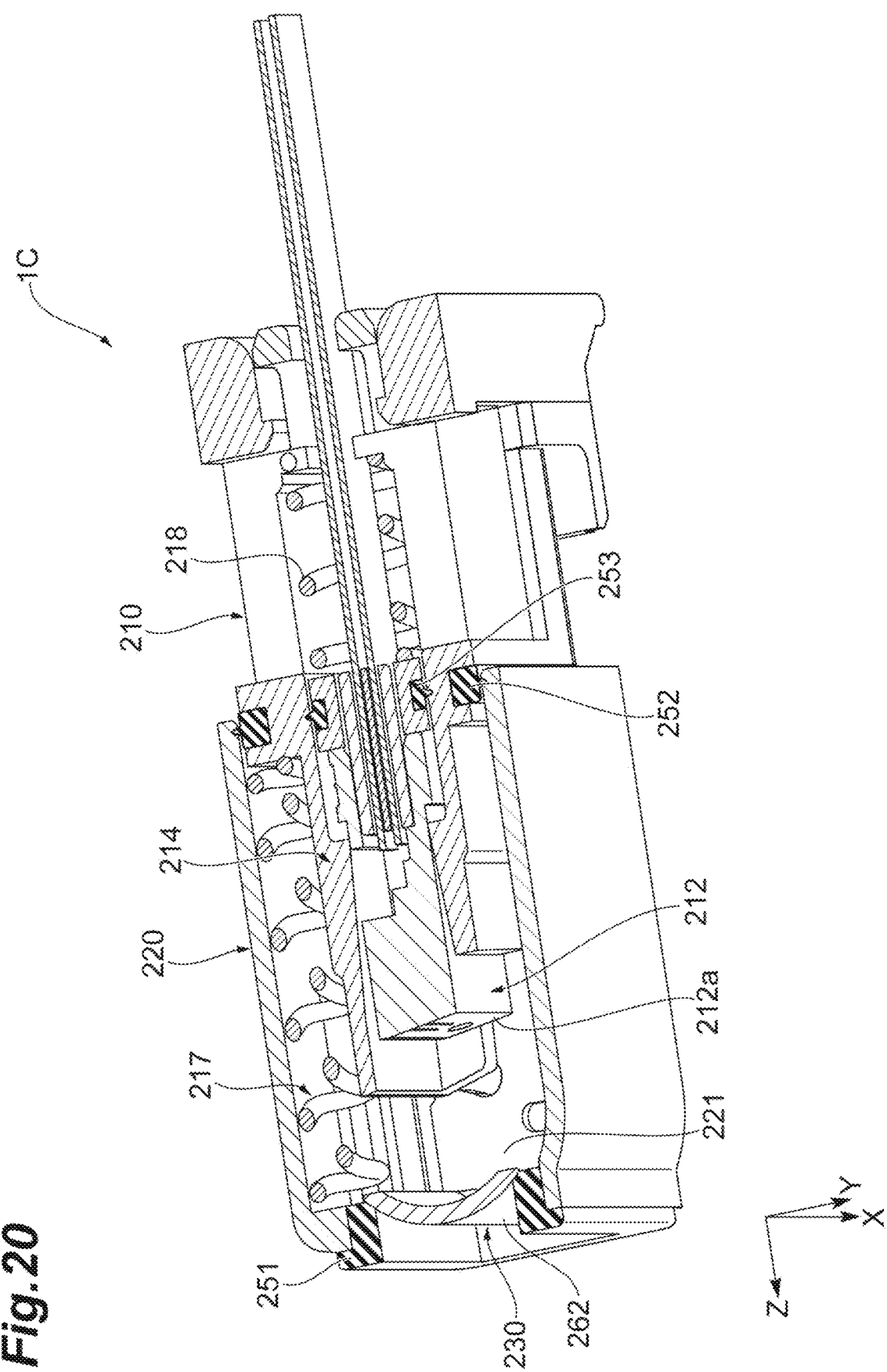
FIG. 20 is a cut-away perspective view illustrating a structure of the optical connector according to the third embodiment, and illustrates a cut-away cross-sectional view along a YZ plane.
Figure 21:
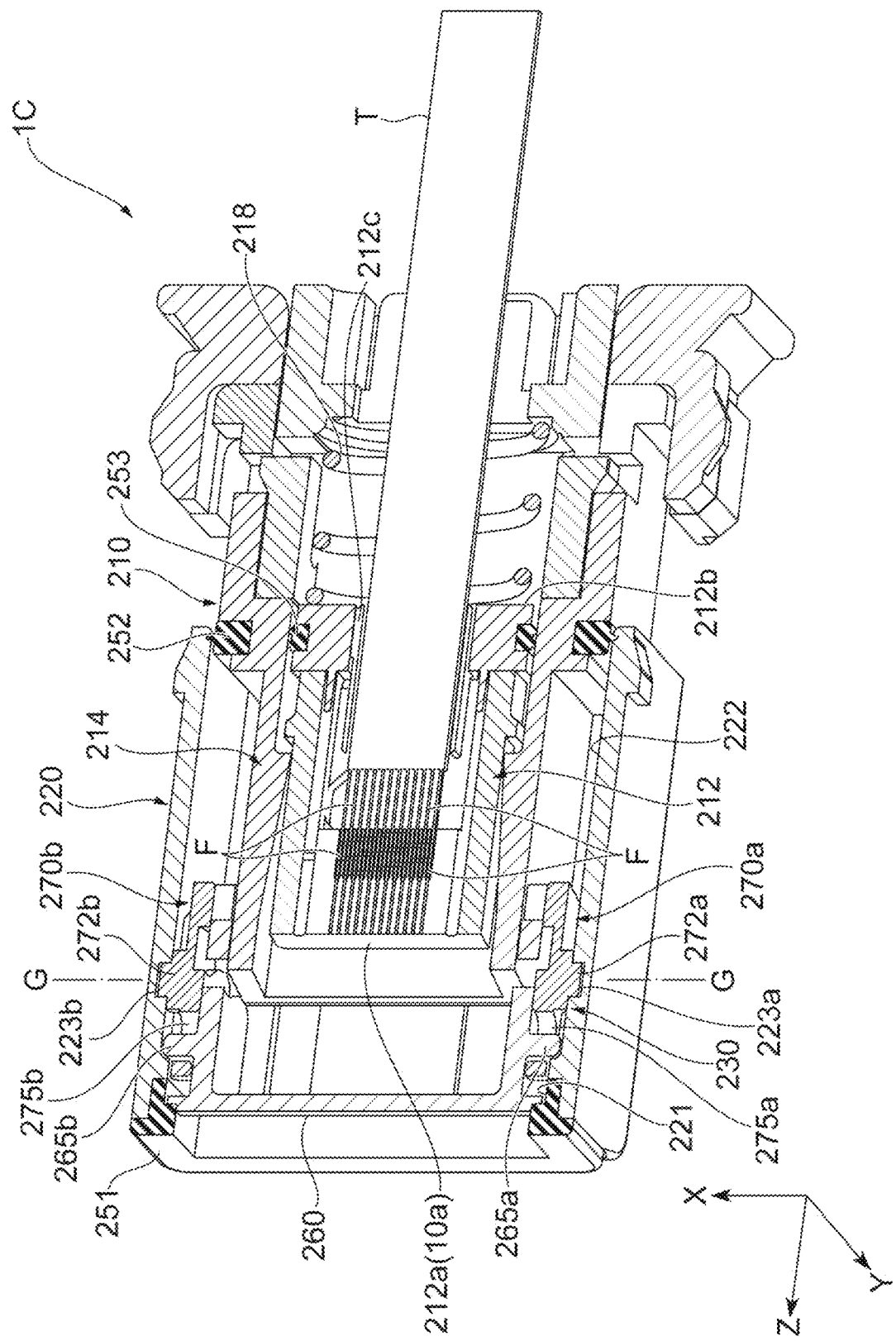
FIG. 21 is another cut-away perspective view illustrating the structure of the optical connector according to the third embodiment, and illustrates a cut-away cross-sectional view along the XZ plane.

Now, a structure of the optical connector 1C will be described in more detail with reference to FIG. 20 and FIG. 21. FIG. 20 is a cut-away perspective view illustrating the structure of the optical connector 1C, and illustrates a cut-away cross-sectional view along a YZ plane. FIG. 21 is another cut-away perspective view illustrating the structure of the optical connector 1C, and illustrates a cut-away cross-sectional view along the XZ plane. As illustrated in FIG. 20 and FIG. 21, the optical connector 1C comprises the optical connection component 210, the outer housing 220 (first member), the shutter component 230 (second member), the sealing member 251 (first sealing member), a sealing member 252 (second sealing member), and a sealing member 253 (third sealing member), similarly to the optical connector 1B.

The optical connection component 210 has the ferrule 212, the inner housing 214, and a coil spring 218 disposed behind the inner housing 214. The optical connection component 210 may have a pair of guide pins like the second embodiment, but may not have any guide pin. The ferrule 212 and the inner housing 214 substantially have the same configuration and function as the ferrule 112 and the inner housing 114. The ribbon T having a plurality of optical fibers F is inserted from a fiber introducing port 212c, and the respective optical fibers F are held by holding holes formed toward a front end surface 212a. That is, the ribbon T is held by the ferrule 212.

The outer housing 220 has the opening 221 (first opening) at a first end in the connection direction (Z direction), has an opening 222 at a second end, similarly to the outer housing 120. The outer housing 220 is slidable (movable) along the connection direction with respect to the optical connection component 210. A spring 217 is provided between the optical connection component 210 and the outer housing 220, and the outer housing 220 can automatically return to an initial position by the spring 217 in a case in which the outer housing 220 slides backward in the connection direction with respect to the optical connection component 210. Other configuration of the outer housing 220 is substantially similar to that of the outer housing 120.

The shutter component 230 is similar to the shutter component 130 in that the shutter component 230 performs rotating motion with shaft projections 272a, 272b fitted in recesses 223a, 223b (bearings) of the outer housing 220 with an axis, and performs opening/closing motion of the shutter part 262. The shutter component 230 is composed of two kinds of components, namely, a first rotary shutter component 260 (first rotary component) and second rotary shutter components 270a, 270b (second rotary components). In the shutter component 230, the shutter component 230 is composed of these two kinds of components, so that before the shutter component 230 (first rotary shutter component 260) is rotated around the rotation axis G when the shutter part 262 is transferred from a closed state to an open state, the first rotary shutter component 260 is slightly moved backward in the Z direction (retreated) by the second rotary shutter components 270a, 270b, similarly to the second embodiment. Additionally, in the shutter component 230, after the shutter component 230 (first rotary shutter component 260) is rotated around the rotation axis G when the shutter part 262 is transferred from an open state to a closed state, the first rotary shutter component 260 is slightly moved forward in the Z direction (advanced) by the second rotary shutter components 270a, 270b, and presses the shutter component 230 against the sealing member 251 to transfer the shutter component 230 to the closed state.

The sealing member 251 is a member blocking a gap between the shutter component 230 and the opening 221. The sealing member 252 is provided between the optical connection component 210 and the outer housing 220 (in an outer groove of the optical connection component 210 in the example of the Fig.), and blocks a gap between the optical connection component 210 and the outer housing 220 near the opening 222 over a whole circumference. The sealing member 252 may be provided on the outer housing 220. The sealing member 253 blocks a gap between a rear part of the ferrule 212, and the inner housing 214, and prevents dust from the back side of the ferrule 212 from entering the front end surface 212a of the ferrule 212 provided with the light incidence/emission end surface 10a.

Figure 22:
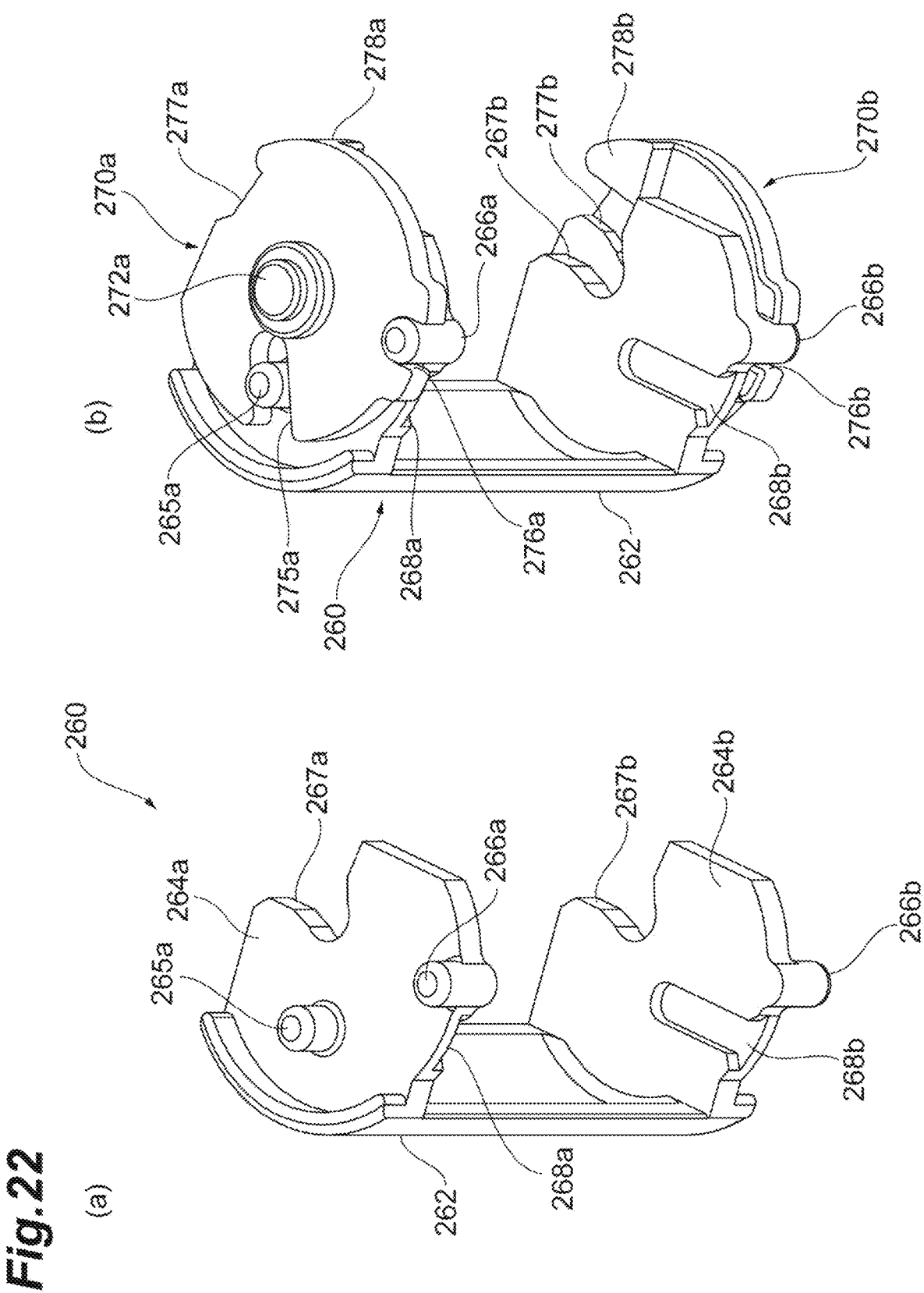
FIG. 22 is a perspective view illustrating an appearance of a first rotary shutter component and a second rotary shutter component of the optical connector according to the third embodiment.

Now, the first rotary shutter component 260 and the second rotary shutter components 270a, 270b configuring the shutter component 230 will be described in more detail with reference to FIG. 22. FIG. 22 is a perspective view illustrating an appearance of the first rotary shutter component and the second rotary shutter components of the optical connector.

As illustrated in an (a) part of FIG. 22, the first rotary shutter component 260 has the shutter part 262 having the same function and shape as the shutter part 162, and support parts 264a, 264b provided in both ends in the X direction (height direction of FIG. 22) of the shutter part 262. The support parts 264a, 264b each have a plate shape extending along the YZ plane. The first rotary shutter component 260 further has projections 265a, 265b (refer to FIG. 21) near the shutter part 262, projections 266a, 266b provided near an end separated from the shutter part 262, cutouts 267a, 267b provided opposite to the projections 266a, 266b, and recesses 268a, 268b provided at positions between the projections 265a, 265b and the projections 266a, 266b on inner surfaces opposite to surfaces where the projection 265a and the like are provided.

As illustrated in a (b) part of FIG. 22, the second rotary shutter components 270a, 270b each have a substantially disk shape, and have a plane-symmetrical shape with respect to the YZ plane. The second rotary shutter components 270a, 270b have the shaft projections 272a, 272b (refer to FIG. 21) forming the rotation axis G, cutouts 275a, 275b (refer to FIG. 21) located near the shutter part 262 and corresponding to the projections 265a, 265b, respectively, cutouts 276a, 276b corresponding to the projections 266a, 266b, respectively, and cutouts 277a, 277b provided at positions corresponding to the cutouts 267a, 267b, respectively. The shaft projections 272a, 272b are fitted in the recesses (bearing) 223a, 223b (refer to FIG. 21) formed in an inside surface of the outer housing 220. Consequently, the shutter component 230 including the second rotary shutter components 270a, 270b is rotatable around the rotation axis G with the shaft projections 272a, 272b as the axis.

In a case in which the second rotary shutter components 270a, 270b are combined with the first rotary shutter component 260, the projections 265a, 265b and the projections 266a, 266b of the first rotary shutter component 260 are stored in the cutouts 275a, 275b and the cutouts 276a, 276b of the second rotary shutter components 270a, 270b, respectively. Additionally, on respective rear surfaces of the second rotary shutter components 270a, 270b, pressing parts 278a, 278b are provided. When the second rotary shutter components 270a, 270b are disposed outside the first rotary shutter component 260, the pressing parts 278a, 278b prevent position shift of the second rotary shutter components 270a, 270b on an XY plane together with the projections 265a, 265b and the projections 266a, 266b stored in the respective cutouts, respectively. Projections 241 of the optical connection component 210 are stored in the cutouts 267a, 267b of the first rotary shutter component 260 and recesses 277a, 277b of the second rotary shutter components 270a, 270b. As illustrated in the (b) part of FIG. 22, the cutouts 267a, 267b and the recesses 277a, 277b are largely different in sizes (steps are for lied), and orders of contact of the respective stored projections 241 are different.

Now, a configuration in which a linkage mechanism 240 is configured by combining the first rotary shutter component 260 and the second rotary shutter components 270a, 270b of the shutter component 230 with the optical connection component 210, and motion of this configuration will be described with reference to FIG. 23 and FIG. 24. FIG. 23 is a perspective view illustrating an internal structure in a state in which the shutter of the optical connector is closed. FIG. 24 is a perspective view illustrating an internal structure in a state in which the shutter of the optical connector is opened.

First, as illustrated in a (b) part and a (c) part of FIG. 23, the first rotary shutter component 260 is attached to the optical connection component 210 in such a way that a pair of upper and lower projections 241 (linkage projections) of the optical connection component 210 are located in the cutouts 267a, 267b of the first rotary shutter component 260. At this time, the projection 241 is disposed on the slightly back side on a side surface along the substantial connection direction of two side surfaces of each of the cutouts 267a, 267b. Then, as illustrated in the (a) part of FIG. 23, the second rotary shutter components 270a, 270b are further mounted on the outside of the first rotary shutter component 260 attached to the optical connection component 210. At this time, the projections 265a, 265b and the projections 266a, 266b of the first rotary shutter component 260 are disposed so as to be located in the cutouts 275a, 275b and the cutouts 276a, 276b of the second rotary shutter components 270a, 270b (refer to the (b) part of FIG. 22), respectively. Additionally, portions projecting from the cutouts 267a, 267b of the first rotary shutter component 260 in the pair of the projections 241 of the optical connection component 210 are stored in the recesses 277a, 277b of the second rotary shutter components 270a, 270b.

Then, in the thus disposed linkage mechanism 240, when the optical connection component 210 first relatively moves forward with respect to the shutter component 230 pivotally supported by the outer housing 220, the pair of projections 241 of the optical connection component 210 move forward in the connection direction in the cutouts 267a, 267b and the recesses 277a, 277b. At this time, side surfaces on the front sides of the recesses 277a, 277b are located on the sides of the projections 241 (back sides in the connection direction) with respect to side surfaces on the front sides of the cutouts 267a, 267b (refer to the (b) part of FIG. 22), the respective projections 241 first come into contact with the side surfaces on the front sides of the recesses 277a, 277b of the second rotary shutter components 270a, 270b, and the second rotary shutter components 270a, 270b are slightly rotated around the rotation axis G. With the rotation, the projections 265a, 265b of the first rotary shutter component 260 stored in the cutouts 275a, 275b of the second rotary shutter components 270a, 270b slide in the cutouts 275a, 275b to be moved up to ends closer to the centers of the cutouts 275a, 275b. By this movement of the cutouts 275a, 275b, the first rotary shutter component 260 slightly moves (retreats) backward in the connection direction, similarly to the first rotary shutter component 160 of the second embodiment. By this movement, the first rotary shutter component 260 separates from the sealing member 251.

Thereafter, when the optical connection component 210 further moves forward in the connection direction, the pair of projections 241 further move forward in the cutouts 267a, 267b of the first rotary shutter component 260, and the recesses 277a, 277b of the second rotary shutter components 270a, 270b, and integrally rotate the first rotary shutter component 260 and the second rotary shutter components 270a, 270b of the shutter component 230 counterclockwise. As illustrated in FIG. 24, by this rotation, the shutter part 262 is transferred to the open state in such a way as to be located on a side part of the outer housing 220 along a curved surface of the outer housing 220, and the front end surface 212a of the ferrule 212 projects forward in the connection direction from the opening 221. An (a) part of FIG. 24 illustrates an internal structure in a state in which the shutter component 230 is thus open, and a (b) part illustrates a state in which the second rotary shutter components 270a, 270b are omitted from the (a) part. When the shutter component 230 transfers from the open state to the closed state, movement reverse to the above movement is performed similarly to the second embodiment.

Figure 25:
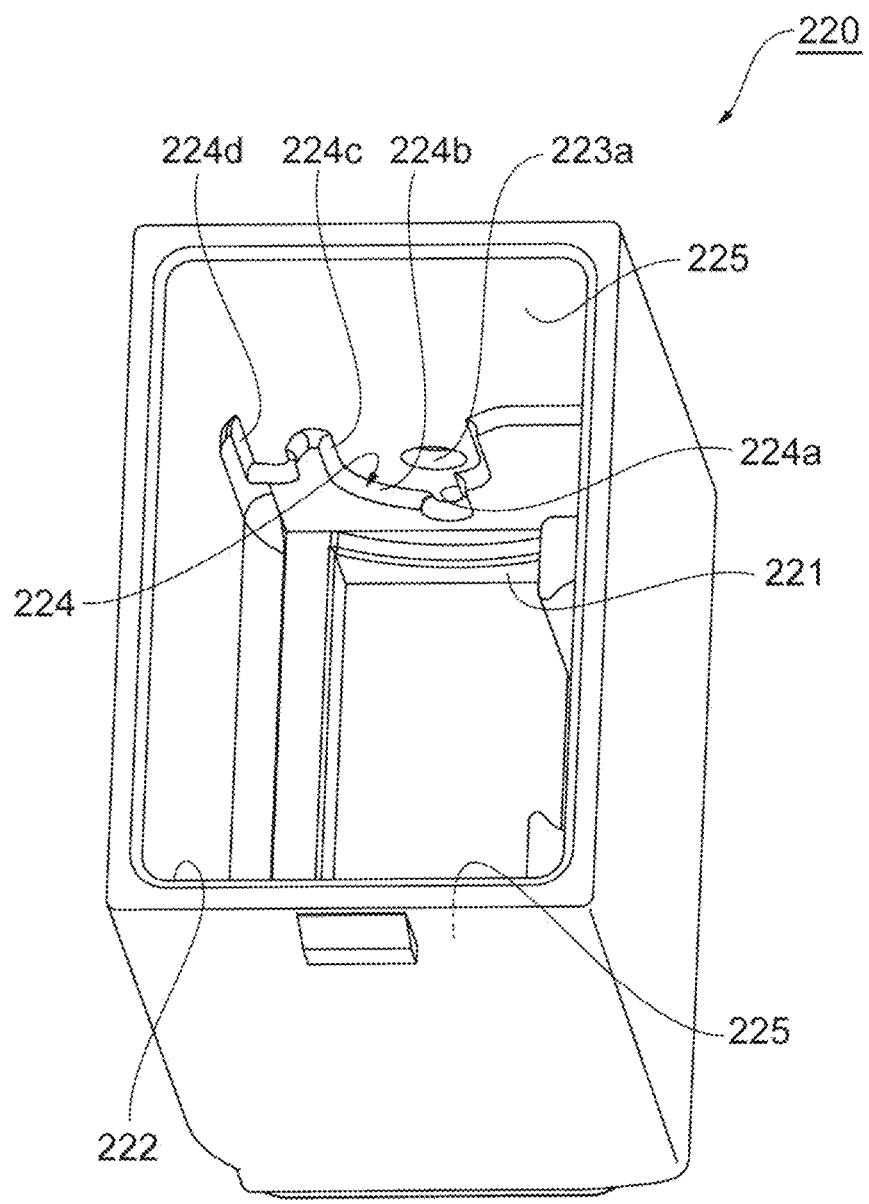
FIG. 25 is a perspective view illustrating an internal structure of an outer housing of the optical connector according to the third embodiment.
Figure 26:
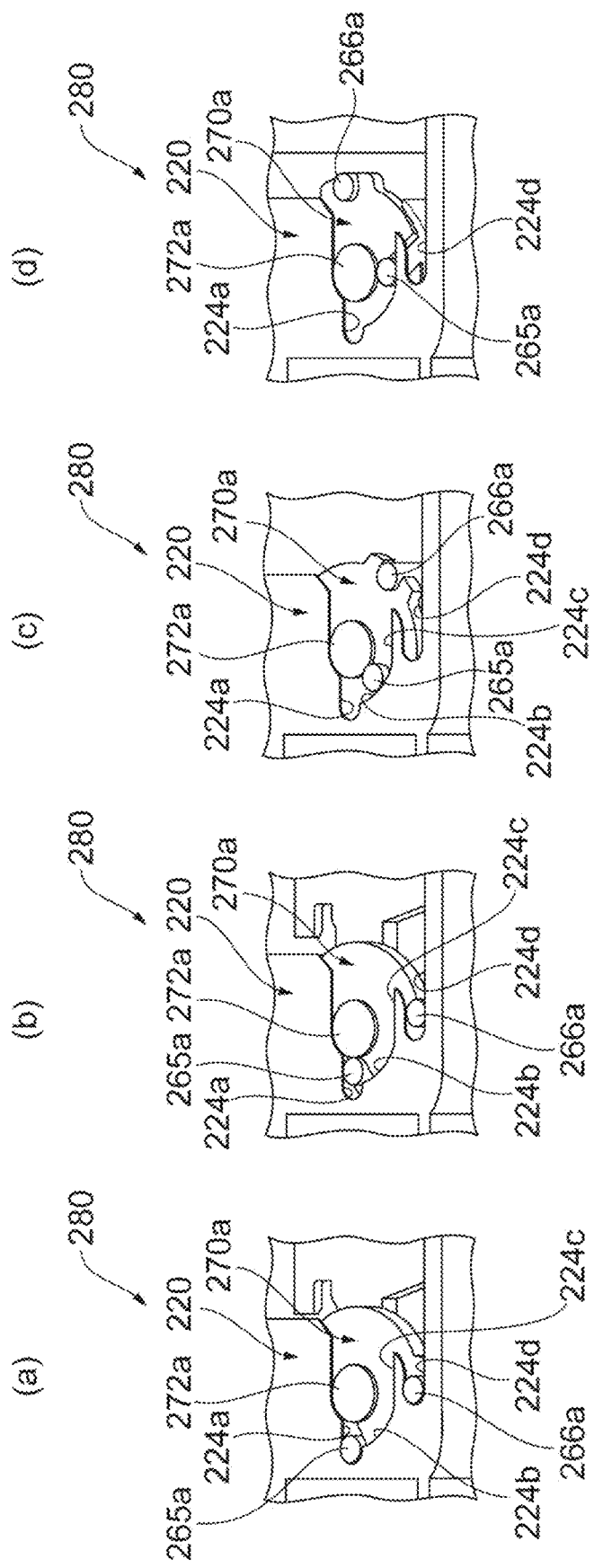
FIG. 26 is a partially cut-away perspective view illustrating a state in which a guide mechanism guides motion of the first rotary shutter component and the second rotary shutter component when a shutter component is opened/closed.

Now, a guide mechanism 280 for guiding opening/closing motion of the above shutter component 230 will be described with reference to FIG. 25 and FIG. 26. The optical connector according to each of the first embodiment and the second embodiment may comprise such a guide mechanism 280. In the optical connector 1C according to this embodiment, the opening/closing motion of the shutter component 230 is guided by the guide mechanism 280 described below. FIG. 25 is a perspective view illustrating an internal structure of the outer housing 220 of the optical connector 1C. FIG. 26 is a partially cut-away perspective view illustrating a state in which the guide mechanism 280 guides motion of the first rotary shutter component 260 and the second rotary shutter component 270a when the shutter component 230 is opened/closed. In FIG. 26, the internal structure is illustrated by horizontally cutting out a part of an upper wall of the outer housing 220. The second rotary shutter component 270b has a similar configuration, and operates similarly.

As illustrated in FIG. 25, in the optical connector 1C according to this embodiment, steps 224 for guiding the projections 265a, 265b, 266a, 266b of the first rotary shutter component 260 performing opening/closing motion of the shutter component 230 are provided in upper and lower inner walls 225 (facing in the X direction) of the outer housing 220. The steps 224 include linear first step parts 224a for guiding movement (retreating and advancing) of the projections 265a, 265b along the connection direction, curved second step parts 224b for guiding rotating motion of the projections 265 around the rotation axis G, linear third step parts 224c for guiding rotating motion of the projections 265 around the rotation axis G, and linear fourth step parts 224d for guiding movement (retreating and advancing) of the projections 266a (266b) in the connection direction. As illustrated in an (a) part of FIG. 26, in the closed state, the first rotary shutter component 260 is disposed in such a way that the projection 265a comes into contact with a base end of the first step part 224a, and the projection 266a (266b) comes into contact with a base end of the fourth step part 224d.

In the shutter component 230 thus disposed, the second rotary shutter component 270a (270b) rotates by movement of the projection 241 of the linkage mechanism 240 forward in the connection direction, so that the first rotary shutter component 260 is slightly moved backward in the connection direction as described above. At the time of this movement, the first step part 224a of the guide mechanism 280 guides movement of the projection 265a (265b) of the first rotary shutter component 260, and the fourth step part 224d guides movement of the projection 266a (266b) of the first rotary shutter component 260. Particularly, in initial movement (linear retreating) from the closed state, the sizes of the cutouts 267a, 267b and the recesses 277a, 277b storing the projections 241 of the linkage mechanism 240 are different, and steps are formed between the both (refer to the (b) part of FIG. 22), and therefore an attitude of the shutter component 230 sometimes become wobble. Therefore, by this guiding, the first rotary shutter component 260 can more reliably linearly move backward in the connection direction as illustrated in a (b) part of FIG. 26. Additionally, the projections 265a (265b) of the first rotary shutter component 260 are further guided by the second step part 224b and the third step part 224c, so that the shutter component 230 that retreats along the connection direction once can more reliably rotate around the rotation axis G, and the shutter part 262 can be reliably brought into the open state. Only a part (upper part) of the shutter component 230 is illustrated in FIG. 26, but a similar guiding is implemented also in the other part (lower part) of the shutter component. The guide mechanism 280 mentioned herein includes the steps 224 (224a to 224d) and the projections 265a, 265b, 266a, 266b guided by the steps 224. Motion guiding when the shutter component 230 transfers from the closed state to the open state is described in the above description, but the guide mechanism 280 performs similar guiding for motion when the shutter component 230 transfers from the open state to the closed state, and the shutter component 230 can be more reliably brought into the closed state.

As described above, in addition to enabling effects similar to those of the optical connector 1A according to the first embodiment and the optical connector 1B according to the second embodiment, the optical connector 1C according to the third embodiment further comprises the guide mechanism 280 for guiding the rotating motion of the shutter component 230 around the rotation axis G, and motion of movement of the shutter component 230 along the connection direction. Therefore, according to the optical connector 1C, at the time of the rotating motion of the shutter component 230 or the movement of the shutter component 230 along the connection direction, motion of the shutter component 230 can be smoothly performed without wobbling of the attitude of the shutter component 230 having the shutter part 262. Additionally, in the optical connector 1C, the steps 224 are provided in the inner walls of the outer housing 220, and the projections 265a, 265b, 266a, 266b are provided in the first rotary shutter component 260 of the shutter component 230. In this case, by a general molding method, the steps 224 and the projections 265a, 265b, 266a, 266b of the guide mechanism 280 can be relatively easily provided in the optical connector 1C. However, by the other method, the steps 224 may be provided in the shutter component 230, and the projections 265a, 265b, 266a, 266b may be provided in the inner walls of the outer housing 220. Additionally, in the above embodiment, in view of the molding method and the like, one of the components of the guide mechanism 280 is formed in a stepped shape. However, in place of this, guide grooves of a similar locus may be provided, motion of the other component of the guide mechanism, namely the projections 265a, 265b, 266a, 266b may be guided by these guide grooves. In this case, guiding of the projection 265a and the like are more reliably performed, and therefore the opening/closing motion of the shutter part 262 can be more smoothly performed. The guide mechanism 280 guides both the motions, namely the rotating motion of the shutter component 230 around the rotation axis G, and the movement of the shutter component 230 along the connection direction in this embodiment, but may guide either one of the motions.

The optical connector and the optical connection structure according to the present invention are not limited to the above embodiments, and other various modifications can be performed. For example, in each of the above embodiments, the shape of the outer surface of the shutter part is the projecting curved surface shape swollen in the direction away from the rotation axis G, but may be other shape such as flatness. Additionally, the distance D1 between the outer surface at the one end of the shutter part, and the rotation axis G is longer than the distance D2 between the outer surface at the one end of the shutter part, and the rotation axis G in each of the above embodiments, but the distances D1 and D2 may be equal to each other. Additionally, in each of the above embodiments, the linkage mechanism has the projections and the cutouts. However, as long as the linkage mechanism has a configuration in which a shutter component is rotated in conjunction with movement of an outer housing in the Z direction with respect to an optical connection component, other various configurations can be applied when the configuration is such that the shutter components are rotated. The shutter part has a light shielding function in each of the above embodiments, but the shutter part may transmit light only for the purpose of dustproof.

Figure 27:
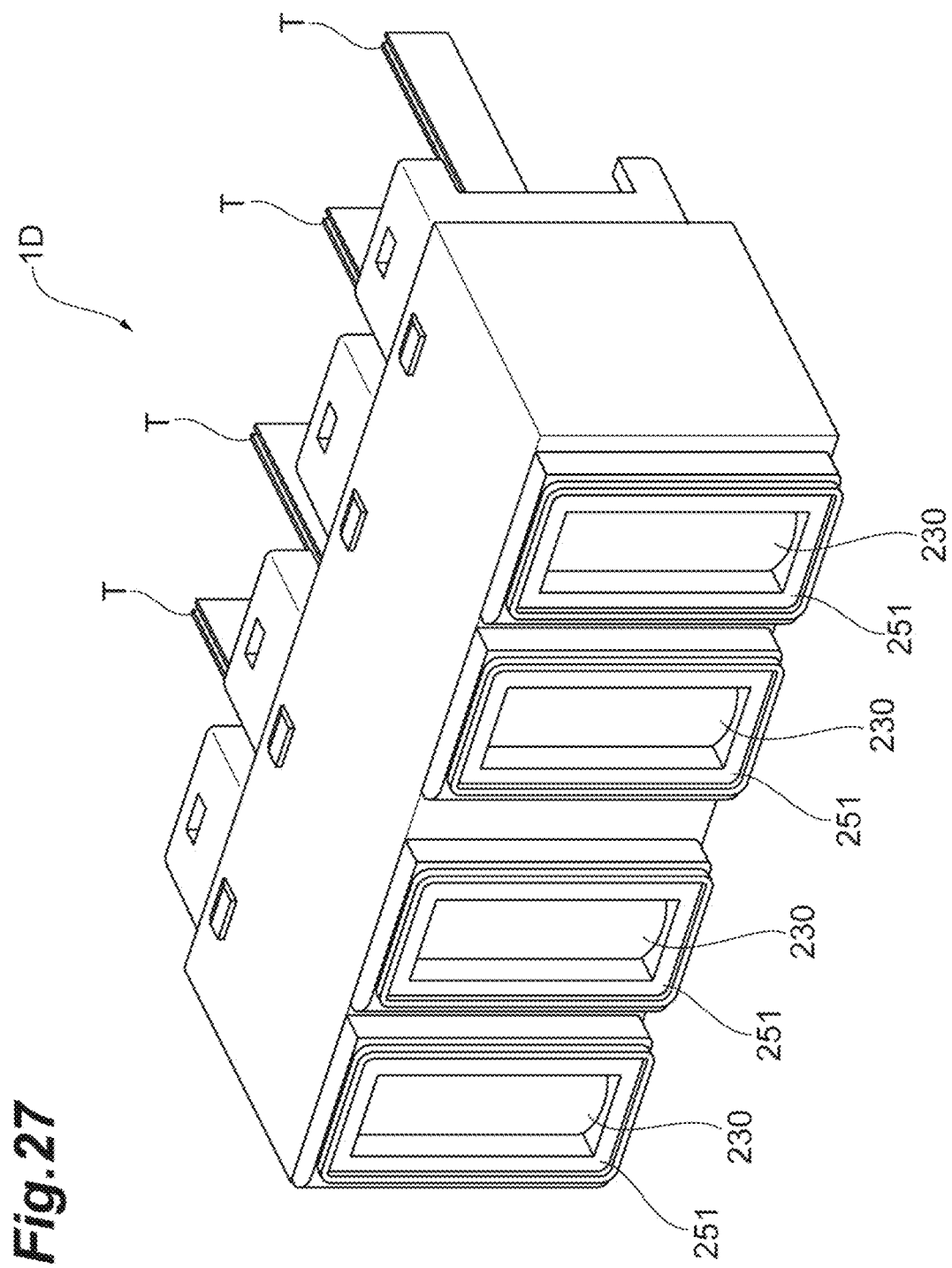
FIG. 27 is a perspective view of a multiple optical connector according to a modification, and illustrates a state in which a shutter is closed.
Figure 28:
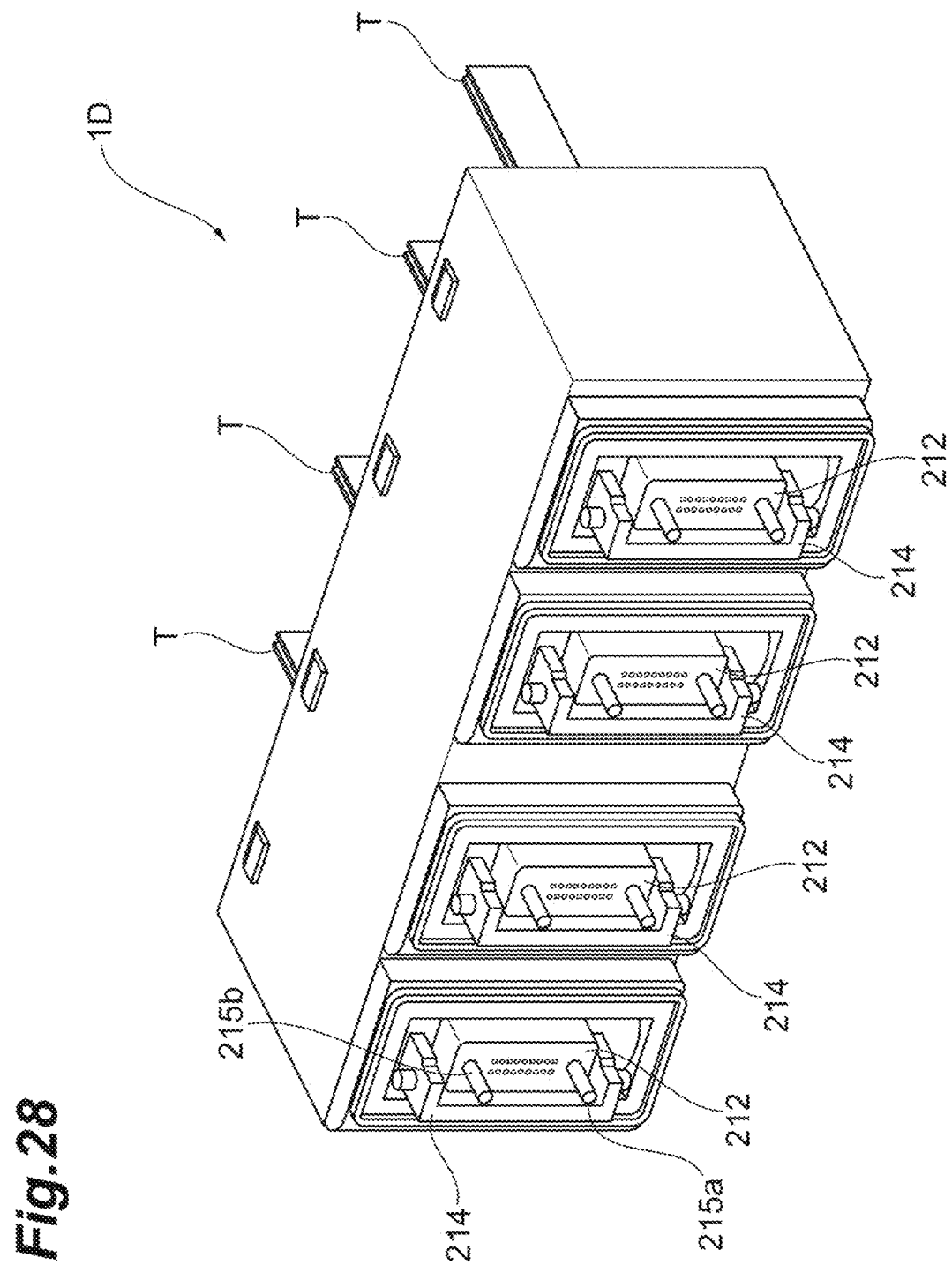
FIG. 28 is a perspective view of the multiple optical connector according to the modification, and illustrates a state in which the shutter is closed.

Although the configuration of the single optical connector is described in each of the above embodiments, the present invention may be applied to a multiple optical connector obtained by using a configuration of each of the optical connector according to each of the above first embodiment to third embodiment as a connector part, and connecting a plurality of the connector parts. In this case, for example, as illustrated in FIG. 27 and FIG. 28, these connector parts may be sequentially arrayed in the direction orthogonal to the connection direction and the axis direction, and be connected to each other. In such a multiple optical connector 1D, a larger number of optical fibers can be optically coupled by a simple means while suppressing adhesion of foreign matters to end surfaces of ferrules and the like. In addition to this, according to such a configuration, walls between adjacent connector parts are omitted or integrated, or respective shutter parts are integrated, so that it is possible to easily attain further miniaturization of the apparatus. From a view point of a dustproof property, a configuration in which each connector part has an individual shutter part can be employed, but a configuration in which a common shutter part is provided may be employed, and the whole configuration may be simplified. Additionally, the plurality of connector parts may be arrayed in the axial direction in such a way that the connection direction of a plurality of the connector parts is aligned, and be connected to each other. Further, in addition to this, the plurality of connector parts may be arrayed also in the direction orthogonal to the connection direction and the axial direction, and be two-dimensionally connected.

In the above embodiments, the first embodiment to the third embodiment are described. However, the present invention is not limited to these, and can include a modification in which a part of each embodiment is applied to other embodiment.

REFERENCE SIGNS LIST 1A, 1B, 1C optical connector
1D multiple optical connector
10, 110, 210 optical connection component
10a light incidence/emission end surface
12, 112, 212 ferrule
12a, 112a, 212a front end surface
12b, 112b, 212b rear end surface
12c, 112c, 212c fiber introducing port
14, 114, 214 inner housing
15a, 15b, 115a, 115b, 215a, 215b guide pin guide pin keeper
20, 120, 220 outer housing (first member)
21, 121, 221 opening (first opening)
22, 122, 222 opening (second opening)
23a, 23b, 123a, 123b, 223a, 223b recess (bearing)
30, 130, 230 shutter component (second member)
32, 162, 262 shutter part
34a, 34b, 164a, 164b, 264a, 264b support part
35a, 35b, 172a, 172b, 272a, 272b shaft projection
41, 141, 174, 241, 265a, 265b, 266a, 266b projection
40, 140, 240 linkage mechanism
42, 168a, 168b, 176a, 176b, 267a, 267b, 275a, 275b, 276a, 276b cutout
51, 151, 251 sealing member (first sealing member)
52, 152, 252 sealing member (second sealing member)
153, 253 sealing member (third sealing member)
160, 260 first rotary shutter component (second member)
166a, 166b hole
170a, 170b, 270a, 270b second rotary shutter component (second member)
216 hole for guide pin
224, 224a to 224b step
268a, 268b, 277a, 277b recess
278a, 278b pressing part
G rotation axis

The invention claimed is:

1. An optical connector comprising:
an optical connection component configured to hold one or a plurality of optical fibers, the optical connection component having a light incidence/emission end surface at one end in a connection direction;
a first member having a cylindrical shape including a first opening and a second opening at a first end and a second end in the connection direction, respectively, the first member being movable along the connection direction with respect to the optical connection component inserted from the second opening;
a second member having a shutter part that performs opening/closing of the first opening, the second member being attached to the first member in a state of being rotatable around a rotation axis intersecting with the connection direction;
a first sealing member being in contact with the first member over a whole circumference of the first opening, the first sealing member also being in contact with the shutter part over the whole circumference of the first opening when the shutter part is in a closed state;
a second sealing member provided in a gap between an outside surface of the optical connection component and an inside surface of the first member, the second sealing member being in contact with both the outside surface of the optical connection component and the inside surface of the first member over the whole circumference of the first member, wherein the second sealing member slides with respect to the outer surface of the optical connection component or the inner surface of the first member when the first member moves along the optical connection component; and
a linkage mechanism that rotates the second member in conjunction with movement of the first member along the connection direction with respect to the optical connection component,
wherein the light incidence/emission end surface projects from the first opening by movement of the first member backward in the connection direction with respect to the optical connection component.

2. The optical connector according to claim 1, wherein the second member has:
a first rotary component having the shutter part, the first rotary component being rotatable around the rotation axis; and
a second rotary component that moves the first rotary component backward in the connection direction before rotating the first rotary component around the rotation axis when the shutter part is transferred from the closed state to an open state.

3. The optical connector according to claim 2, wherein the second rotary component moves the first rotary component forward in the connection direction after rotating the first rotary component around the rotation axis when the shutter part is transferred from the open state to the closed state.

4. The optical connector according to claim 2, wherein the second rotary component moves the first rotary component forward or backward along the connection direction in conjunction with movement of the first member along the connection direction with respect to the optical connection component.

5. The optical connector according to claim 2, wherein the second rotary component has a structure in which linear movement of the first member along the connection direction is converted into rotating motion, and moves the first rotary component forward or backward along the connection direction by motion conversion by the structure.

6. The optical connector according to claim 2,
wherein the first rotary component has a first projection and a second projection, and a hole or a cutout corresponding to a linkage projection of the optical connection component;
wherein the second rotary component has a shaft projection attached to a bearing of the first member in a rotatable state, a first hole or a first cutout corresponding to the first projection, a second hole or a second cutout corresponding to the second projection, and a third hole or a third cutout corresponding to the linkage projection of the optical connection component; and
wherein the linkage projection of the optical connection component is located in the hole or the cutout of the first rotary component, and the third hole or the third cutout of the second rotary component, the first projection of the first rotary component is located in the first hole or the first cutout of the second rotary component, and the second projection of the first rotary component is located in the second hole or the second cutout of the second rotary component.

7. The optical connector according to claim 2,
wherein the second rotary component has a shaft projection attached to a bearing of the first member in a rotatable state, a first projection and a second projection provided on a surface opposite to the shaft projection, a hole or a cutout corresponding to a linkage projection of the optical connection component,
wherein the first rotary component has a first hole or a first cutout corresponding to the first projection of the second rotary component, and having a long hole shape extending so as to incline to the connection direction, a second hole or a second cutout corresponding to the second projection of the second rotary component and the linkage projection of the optical connection component, and
wherein the linkage projection of the optical connection component is located in the second hole or the second cutout of the first rotary component, and the hole or the cutout of the second rotary component, the first projection of the second rotary component is located in the first hole or the first cutout of the first rotary component, and the second projection of the second rotary component is located in the second hole or the second cutout of the first rotary component.

8. The optical connector according to claim 1, comprising a guide mechanism that guides at least one of rotating motion of the second member around the rotation axis, and movement of the second member along the connection direction,
wherein the guide mechanism has a step or a groove provided in one of the first member and the second member, and a guide projection provided in the other of the first member and the second member, and the step or the groove guides movement of the guide projection.

9. The optical connector according to claim 8, wherein the step or the groove is provided in an inner wall of the first member, and the guide projection is provided in the second member.

10. The optical connector according to claim 1,
wherein the optical connection component has a ferrule having the light incidence/emission end surface on a front side in the connection direction, and an inner housing covering and holding the ferrule, and
wherein the optical connector further comprising a third sealing member being in contact with both the ferrule and the inner housing on a back side in the connection direction.

11. The optical connector according to claim 1,
wherein a shape of an outer surface of the shutter part in a cross-section perpendicular to the rotation axis is a projecting curved line shape swollen in a direction away from the rotation axis, and
wherein a distance between the outer surface at one end of the shutter part on an opening direction, and the rotation axis is longer than a distance between the outer surface at one end of the shutter part on a closing direction, and the rotation axis.

12. The optical connector according to claim 1,
wherein the linkage mechanism has:
a linkage projection provided in one of the optical connection component and the second member; and
a linkage hole or a linkage cutout provided in the other of the optical connection component and the second member, the linkage hole or the linkage cutout being engaging with the linkage projection; and
wherein a distance between the light incidence/emission end surface, and the linkage projection in the connection direction is 20 mm or less.

13. The optical connector according to claim 12,
wherein the linkage projection is provided in the optical connection component, and the linkage hole or the linkage cutout is provided in the second member, and
wherein a distance between the rotation axis and the linkage projection in the closed state of the shutter part, and a distance between the rotation axis and the linkage projection in the open state of the shutter part are equal to each other.

14. The optical connector according to claim 1, wherein the second member includes at least one material of POM, nylon, and HDPE.

15. The optical connector according to claim 1, wherein transmittance of the shutter part to light of a wavelength of 800 nm to 1600 nm is 0% to 50%.

16. The optical connector according to claim 1, wherein the second sealing member is fixed to the optical connection component, and the first member and the second sealing member mutually slide, or the second sealing member is fixed to the first member, and the optical connection component and the second sealing member mutually slide.

17. The optical connector according to claim 1, wherein the second member moves backward in the connection direction before rotation of the second member around the rotation axis when the shutter part is transferred from the closed state to the open state.

18. The optical connector according to claim 1, comprising a guide mechanism that guides motion of the second member, the guide mechanism guiding at least one of linear movement and rotating motion of the second member.

19. A multiple optical connector comprising a plurality of connector parts, each of the connector parts being the optical connector according to claim 1, wherein the plurality of connector parts are sequentially arrayed in a direction intersecting with both the connection direction and the rotation axis, and connected to each other.

20. An optical connection structure comprising a first optical connector and a second optical connector each being the optical connector according to claim 1, wherein the first sealing member of the first optical connector, and the first sealing member of the second optical connector abut on each other over whole circumferences of the respective first openings when the first optical connector and the second optical connector are connected to each other along the connection direction, and the first member moves backward in the connection direction with respect to the optical connection component by pressing force generated by the abutting.

* * * * *